(12) United States Patent
Takahashi

(10) Patent No.: US 11,924,566 B2
(45) Date of Patent: Mar. 5, 2024

(54) SOLID-STATE IMAGING DEVICE AND ELECTRONIC DEVICE

(71) Applicant: Sony Semiconductor Solutions Corporation, Kanagawa (JP)

(72) Inventor: Keiichiro Takahashi, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 18/119,988

(22) Filed: Mar. 10, 2023

(65) Prior Publication Data

US 2023/0224604 A1  Jul. 13, 2023

Related U.S. Application Data

(63) Continuation of application No. 17/862,716, filed on Jul. 12, 2022, now Pat. No. 11,632,510, which is a
(Continued)

(30) Foreign Application Priority Data

Jun. 30, 2017 (JP) .................................. 2017-129599

(51) Int. Cl.
*H04N 25/704* (2023.01)
*G03B 13/36* (2021.01)
(Continued)

(52) U.S. Cl.
CPC ........... *H04N 25/704* (2023.01); *H04N 23/10* (2023.01); *H04N 25/77* (2023.01)

(58) Field of Classification Search
CPC ...... H04N 25/704; H04N 25/77; H04N 25/76; H04N 25/778; H04N 23/10; H01L 27/14603; G03B 13/36
See application file for complete search history.

(56) References Cited

U.S. PATENT DOCUMENTS 9,172,927 B2  10/2015 Aoki et al.
9,461,083 B2  10/2016 Takahashi
(Continued)

FOREIGN PATENT DOCUMENTS

CN  103227897 A  7/2013
CN  205187738 A  12/2015
(Continued)

OTHER PUBLICATIONS

International Search Report for corresponding International Application No. PCT/JP2018/022835 dated Aug. 21, 2018.
(Continued)

*Primary Examiner* — Marly S Camargo
(74) *Attorney, Agent, or Firm* — Michael Best & Friedrich LLP

(57) ABSTRACT

The present disclosure relates to a solid-state imaging device and an electronic device that can be provided with phase difference pixels with a lower degree of difficulty in manufacturing.
Provided is a solid-state imaging device including a pixel array unit in which a plurality of pixels is two-dimensionally arrayed, in which the pixel array unit has an array pattern in which a plurality of pixel groups each including neighboring pixels of an identical color is regularly arrayed, and among the plurality of pixel groups arrayed in the array pattern, pixels configuring a light-shielded pixel group are shielded in an identical direction side from light, the light-shielded pixel group being a pixel group including pixels each being shielded in a part of a light incident side from the light. The present technology can be applied to, for example, a CMOS image sensor including pixels for phase difference detection.

20 Claims, 15 Drawing Sheets

Related U.S. Application Data continuation of application No. 16/626,300, filed as application No. PCT/JP2018/022835 on Jun. 15, 2018, now Pat. No. 11,418,741.

(51) Int. Cl.
*H04N 23/10* (2023.01)
*H04N 25/76* (2023.01)
*H04N 25/77* (2023.01)

(56) References Cited

U.S. PATENT DOCUMENTS

| | | | |
|---|---|---|---|
| 9,661,210 | B2 | 5/2017 | Haneda |
| 9,819,846 | B2 | 11/2017 | Masuda et al. |
| 10,632,055 | B2 * | 4/2020 | Gluskin ............ H01L 27/14623 |
| 10,992,890 | B2 * | 4/2021 | Yamamoto ............ H04N 23/10 |
| 11,418,741 | B2 | 8/2022 | Takahashi |
| 11,488,996 | B2 | 11/2022 | Lee et al. |
| 11,563,923 | B2 * | 1/2023 | Hoshino ................ H04N 25/46 |
| 11,632,510 | B2 * | 4/2023 | Takahashi ............... H04N 23/10 |
| 2008/0054320 | A1 | 3/2008 | Solhusvik et al. |
| 2009/0213256 | A1 | 8/2009 | Kudoh |
| 2011/0279727 | A1 | 11/2011 | Kusaka |
| 2012/0224096 | A1 | 9/2012 | Shimoda et al. |
| 2013/0222546 | A1 | 8/2013 | Takashashi |
| 2013/0222553 | A1 | 8/2013 | Tsuchita |
| 2014/0022427 | A1 | 1/2014 | Goto et al. |
| 2015/0015749 | A1 | 1/2015 | Ito |
| 2015/0062394 | A1 | 3/2015 | Ikeda et al. |
| 2015/0109499 | A1 | 4/2015 | Yamashita |
| 2015/0373251 | A1 | 12/2015 | Haneda |
| 2016/0112614 | A1 | 4/2016 | Masuda et al. |
| 2016/0344962 | A1 | 11/2016 | Hirai |
| 2019/0013489 | A1 | 1/2019 | Yamaguchi |
| 2019/0082130 | A1 * | 3/2019 | Li ........................ H04N 23/10 |
| 2019/0199952 | A1 | 6/2019 | Wan et al. |
| 2019/0252450 | A1 | 8/2019 | Noudo |
| 2019/0281240 | A1 * | 9/2019 | Jung .................... H04N 25/704 |
| 2020/0161352 | A1 | 5/2020 | Takahashi et al. |
| 2020/0161382 | A1 * | 5/2020 | Takahashi ............ H04N 25/704 |
| 2020/0358989 | A1 | 11/2020 | Hoshino |
| 2020/0404203 | A1 | 12/2020 | Jung et al. |
| 2021/0144321 | A1 | 5/2021 | Yamashita et al. |
| 2022/0038663 | A1 | 2/2022 | Hoshino |
| 2022/0232184 | A1 | 7/2022 | Lee |
| 2022/0345651 | A1 | 10/2022 | Tachi et al. |

FOREIGN PATENT DOCUMENTS

| | | |
|---|---|---|
| JP | 2003-007994 A | 1/2003 |
| JP | 2011-103335 A | 5/2011 |
| JP | 2015-012127 A | 1/2015 |
| JP | 2015133469 A | 7/2015 |
| JP | 5764884 B2 | 8/2015 |
| JP | 2016-005189 A | 1/2016 |
| JP | 2017-050723 | 3/2017 |
| JP | 2017-059739 | 3/2017 |
| JP | 2017-085484 S | 5/2017 |
| KR | 20160034255 A | 3/2016 |
| WO | WO-2013042606 A1 | 3/2013 |

OTHER PUBLICATIONS

Extended European Search Report dated Apr. 24, 2020 for corresponding European Application No. 18825524.4.
European Patent Office Communication Pursuant to Article 94 (3) dated Mar. 29, 2021 for corresponding European Application No. 18825524.4.
Chinese Office Action dated Oct. 27, 2021 for corresponding Chinese Application No. 201880033579.8.

* cited by examiner

SOLID-STATE IMAGING DEVICE AND ELECTRONIC DEVICE

CROSS REFERENCE TO RELATED APPLICATIONS

This application is a Continuation application of U.S. application Ser. No. 17/862,716 filed Jul. 12, 2022, and which is a continuation application of U.S. application Ser. No. 16/626,300, filed Dec. 23, 2019 and issued as U.S. Pat. No. 11,418,741 Jul. 27, 2022, and is a 371 Nationalization of PCT/JP2018/022835, filed Jun. 15, 2018 and claims the benefit of Japanese Priority Patent Application JP 2017-129599 filed on Jun. 30, 2017, the entire contents of which are incorporated herein by reference.

TECHNICAL FIELD

The present disclosure relates to a solid-state imaging device and an electronic device, and more particularly, to a solid-state imaging device and an electronic device that can be provided with phase difference pixels with a lower degree of difficulty in manufacturing.

BACKGROUND ART

In recent years, to improve autofocus speed, a solid-state imaging device is used in which pixels are arranged for phase difference detection (hereinafter referred to as phase difference pixels).

As a structure of this type of phase difference pixel, a structure is known in which pupil division is performed by embedding a plurality of photoelectric conversion elements such as photodiodes in one on-chip lens (see, for example, Patent Document 1).

Furthermore, as an array pattern of a plurality of pixels two-dimensionally arrayed in a pixel array unit, an array pattern is known in which shared pixels are regularly arrayed that share a pixel circuit with neighboring pixels of the same color (four pixels of 2×2 of the same color).

CITATION LIST

Patent Document

Patent Document 1: Japanese Patent Application Laid-Open No. 2015-12127

SUMMARY OF THE INVENTION

Problems to be Solved by the Invention

By the way, in a case where an array pattern is adopted in which shared pixels are regularly arrayed that include neighboring pixels of the same color, in provision of the phase difference pixel, if a plurality of photoelectric conversion elements is to be provided for one on-chip lens, generally, the degree of difficulty in manufacturing increases.

In other words, in the shared pixels having a structure in which the plurality of photoelectric conversion elements is provided for one on-chip lens, generally, it is necessary to increase the size of the on-chip lens compared to a normal pixel having a structure in which one photoelectric conversion element is provided. Furthermore, it is necessary to change the driving method between the normal pixel and the phase difference pixel.

Therefore, since it is necessary to partially change the structure of the pixel, and the degree of difficulty increases from a viewpoint of manufacturing, a technology has been demanded for providing phase difference pixels with a lower degree of difficulty in manufacturing.

The present disclosure has been made in view of such a situation, and makes it possible to provide phase difference pixels with a lower degree of difficulty in manufacturing.

Solutions to Problems

A solid-state imaging device according to an aspect of the present disclosure is a solid-state imaging device including a pixel array unit in which a plurality of pixels is two-dimensionally arrayed, in which the pixel array unit has an array pattern in which a plurality of pixel groups each including neighboring pixels of an identical color is regularly arrayed, and among the plurality of pixel groups arrayed in the array pattern, pixels configuring a light-shielded pixel group are shielded in an identical direction side from light, the light-shielded pixel group being a pixel group including pixels each being shielded in a part of a light incident side from the light.

In the solid-state imaging device according to the aspect of the present disclosure, the pixel array unit is provided in which the plurality of pixels is two-dimensionally arrayed, and the pixel array unit has the array pattern in which the plurality of pixel groups each including the neighboring pixels of the identical color is regularly arrayed, and among the plurality of pixel groups arrayed in the array pattern, the pixels configuring the light-shielded pixel group are shielded in the identical direction side from the light, the light-shielded pixel group being the pixel group including the pixels each being shielded in the part of the light incident side from the light.

An electronic device according to an aspect of the present disclosure is an electronic device including: an imaging unit that includes a solid-state imaging device including a pixel array unit in which a plurality of pixels is two-dimensionally arrayed, in which the pixel array unit has an array pattern in which a plurality of pixel groups each including neighboring pixels of an identical color is regularly arrayed, and among the plurality of pixel groups arrayed in the array pattern, pixels configuring a light-shielded pixel group are shielded in an identical direction side from light, the light-shielded pixel group being a pixel group including pixels each being shielded in a part of a light incident side from the light; and a control unit that performs autofocus control on the basis of a phase difference detection result obtained from output of the light-shielded pixel group.

In the electronic device according to the aspect of the present disclosure, the imaging unit is provided including the solid-state imaging device in which the pixel array unit is provided in which the plurality of pixels is two-dimensionally arrayed, and the pixel array unit has the array pattern in which the plurality of pixel groups each including the neighboring pixels of the identical color is regularly arrayed, and among the plurality of pixel groups arrayed in the array pattern, the pixels configuring the light-shielded pixel group are shielded in the identical direction side from the light, the light-shielded pixel group being the pixel group including the pixels each being shielded in the part of the light incident side from the light. Then, the autofocus control is performed on the basis of the phase difference detection result obtained from the output of the light-shielded pixel group.

Effects of the Invention

According to an aspect of the present disclosure, phase difference pixels can be provided with a lower degree of difficulty in manufacturing.

Note that, the effect described here is not necessarily limited, and can be any effect described in the present disclosure.

MODE FOR CARRYING OUT THE INVENTION

Figure 1:
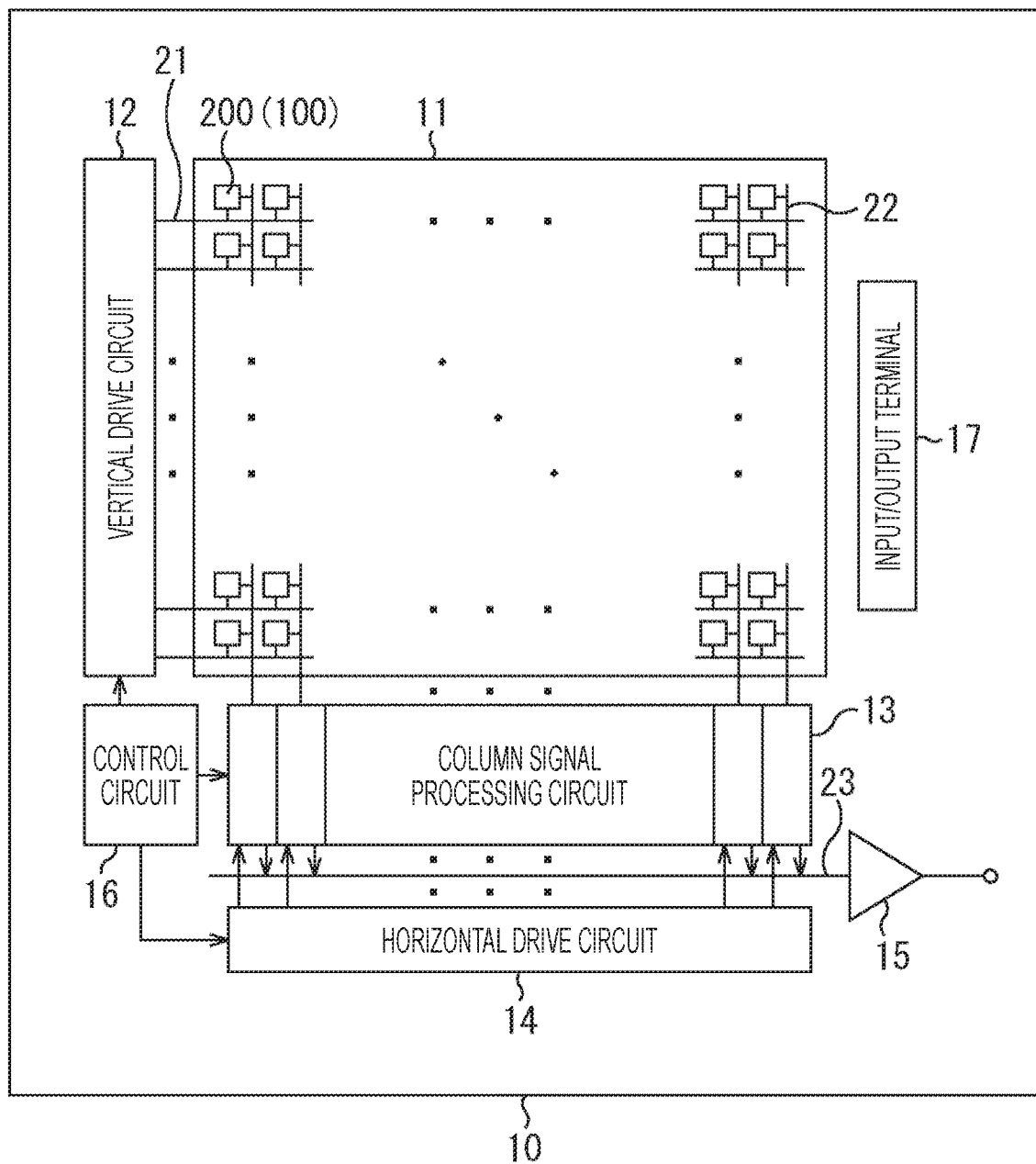
FIG. 1 is a block diagram illustrating a configuration example of an embodiment of a solid-state imaging device to which a technology according to the present disclosure is applied.

Hereinafter, embodiments of a technology (the present technology) according to the present disclosure will be described with reference to the drawings. Note that, the description will be made in the following order.

1. Configuration of solid-state imaging device
2. Embodiment of the present technology
3. Modifications
4. Configuration of electronic device
5. Usage example of solid-state imaging device
6. Application example to mobile body

1. Configuration of Solid-State Imaging Device (Configuration Example of Solid-State Imaging Device)

FIG. 1 is a block diagram illustrating a configuration example of an embodiment of a solid-state imaging device to which the technology according to the present disclosure is applied.

A CMOS image sensor 10 of FIG. 1 is an example of a solid-state imaging device using a complementary metal oxide semiconductor (CMOS). The CMOS image sensor 10 takes incident light (image light) from a subject via an optical lens system (not illustrated), and converts an amount of incident light imaged on an imaging surface into an electric signal on a pixel basis, and outputs the electric signal as a pixel signal.

In FIG. 1, the CMOS image sensor 10 includes a pixel array unit 11, a vertical drive circuit 12, column signal processing circuits 13, a horizontal drive circuit 14, an output circuit 15, a control circuit 16, and an input/output terminal 17.

In the pixel array unit 11, a plurality of pixel groups 200 is arrayed two-dimensionally (in a matrix). The pixel groups 200 each include four pixels 100 (four pixels of 2×2) of the same color.

Each of the pixel groups 200 includes, as the four pixels 100 of the same color, red (R) pixels, green (G) pixels, or blue (B) pixels corresponding to a red (R), green (G), or blue (B) color filter. Furthermore, the pixel groups 200 are each configured as shared pixels in which a pixel circuit is shared by the four pixels 100 of the same color.

In each of the pixel groups 200, the pixels 100 of the same color each include a photodiode (PD) as a photoelectric conversion element and a transfer transistor. Furthermore, in each of the pixel groups 200, the four pixels 100 of the same color share a reset transistor, an amplification transistor, and a selection transistor as the pixel circuit.

Note that, as will be described later in detail, in the pixel array unit 11, light-shielded pixel groups each including white (W) pixels (four pixels of 2×2) as phase difference pixels are arranged to be scattered in a repeating pattern. The phase difference pixel is a pixel for phase difference detection, and is also referred to as a phase detection auto focus (PDAF) pixel or the like.

The vertical drive circuit 12 includes a shift register, for example, and selects a predetermined pixel drive line 21 to supply a drive signal (pulse) for driving the pixels 100 or the pixel groups 200 to the pixel drive line 21 selected, and drives the pixels 100 or the pixel groups 200 on a row basis.

In other words, the vertical drive circuit 12 selectively scans each of the pixels 100 or each of the pixel groups 200 of the pixel array unit 11 in the vertical direction sequentially on a row basis, and supplies a pixel signal based on charges (signal charges) generated in accordance with a received amount of light in the photodiode of each of the pixels 100 to each of the column signal processing circuits 13 through a vertical signal line 22.

The column signal processing circuits 13 are arranged for respective columns of the pixel groups 200, and perform signal processing such as noise reduction and the like for respective pixel columns on signals output from one row of the pixel groups 200. For example, the column signal processing circuits 13 perform signal processing such as correlated double sampling (CDS) for reducing pixel-specific fixed pattern noise and analog/digital (A/D) conversion.

The horizontal drive circuit 14 includes a shift register, for example, and selects each of the column signal processing circuits 13 in order by sequentially outputting horizontal scanning pulses, and causes each of the column signal processing circuits 13 to output the pixel signal to a horizontal signal line 23.

The output circuit 15 performs signal processing on the signal sequentially supplied through the horizontal signal line 23 from each of the column signal processing circuits 13 and outputs the signal. Note that, the output circuit 15, for example, may perform only buffering, and may perform black level adjustment, column variation correction, various types of digital signal processing, and the like.

The control circuit 16 controls operation of each unit of the CMOS image sensor 10.

Furthermore, the control circuit 16 generates a control signal and a clock signal as a reference of operation of the vertical drive circuit 12, the column signal processing circuits 13, the horizontal drive circuit 14, and the like, on the basis of a vertical synchronization signal, a horizontal synchronization signal, and a master clock signal. The control circuit 16 outputs the control signal and the clock signal generated, to the vertical drive circuit 12, the column signal processing circuits 13, the horizontal drive circuit 14, and the like.

The input/output terminal 17 exchanges signals with the outside.

The CMOS image sensor 10 of FIG. 1 configured as described above is a CMOS image sensor referred to as a column AD system in which the column signal processing circuits 13 for performing CDS processing and AD conversion processing are arranged for the respective pixel columns. Furthermore, the CMOS image sensor 10 of FIG. 1 can be, for example, a back-illuminated CMOS image sensor.

2. Embodiment of the Present Technology

By the way, as a structure of the pixels arrayed in the pixel array unit 11 (FIG. 1), a structure is known in which the pixels are divided and saturation electron amounts obtained by those divided pixels are added together to increase a saturation electron amount (Qs).

For example, in A of FIG. 2, a cross-sectional view is illustrated of a structure in which a photodiode 112 as a photoelectric conversion element is formed immediately below one on-chip lens 111.

Figure 2:
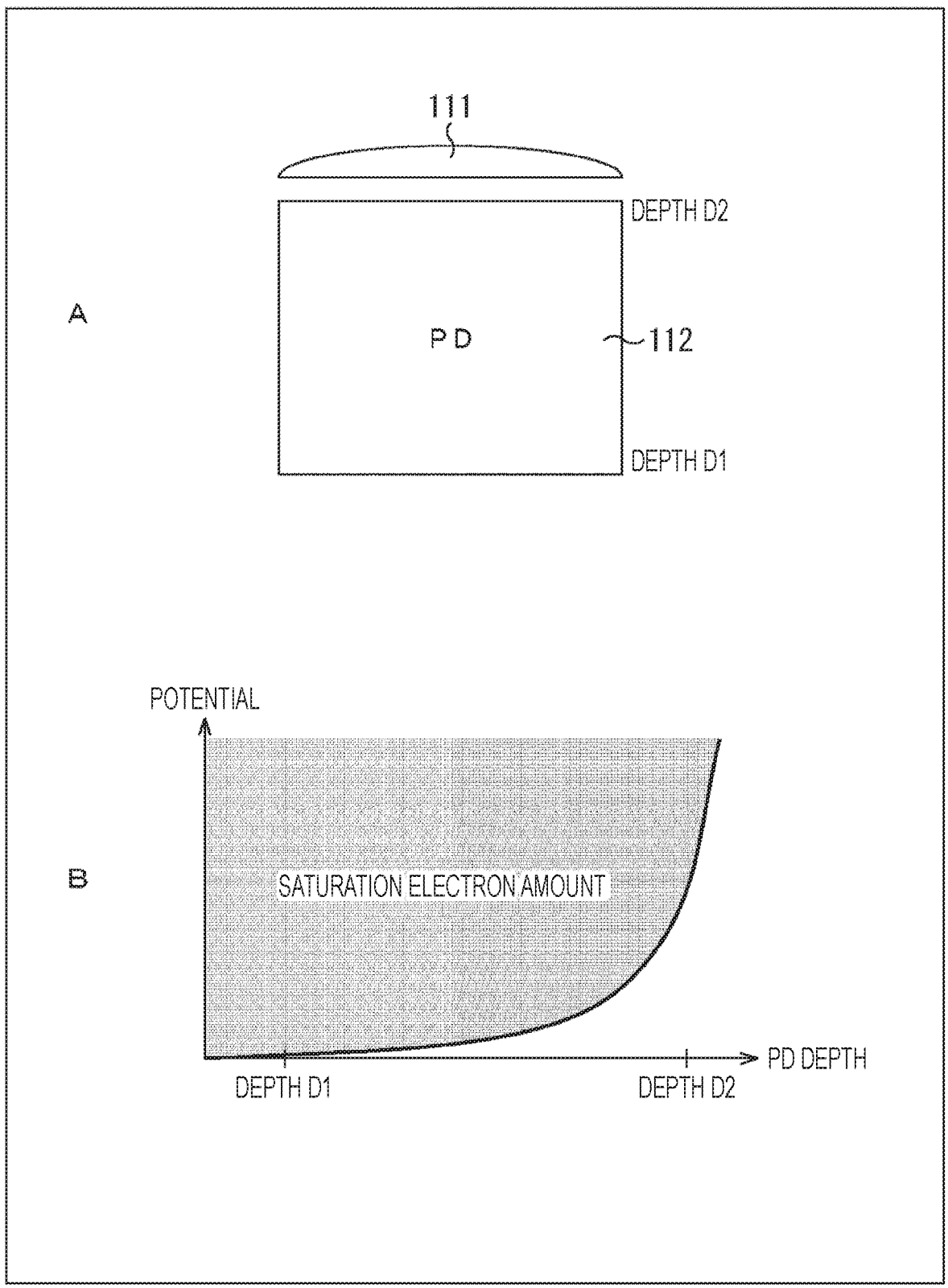
FIG. 2 is a diagram for explaining a saturation electron amount of a single pixel.

Furthermore, in B of FIG. 2, the saturation electron amount (Qs) of the photodiode 112 is illustrated, where the horizontal axis is the depth (PD depth) of the photodiode 112 (A of FIG. 2) and the vertical axis is the potential. However, as the depth of the photodiode 112, the depth of a surface opposite to a light incident surface is represented by a depth D1, and the depth of the light incident surface is represented by a depth D2.

Figure 3:
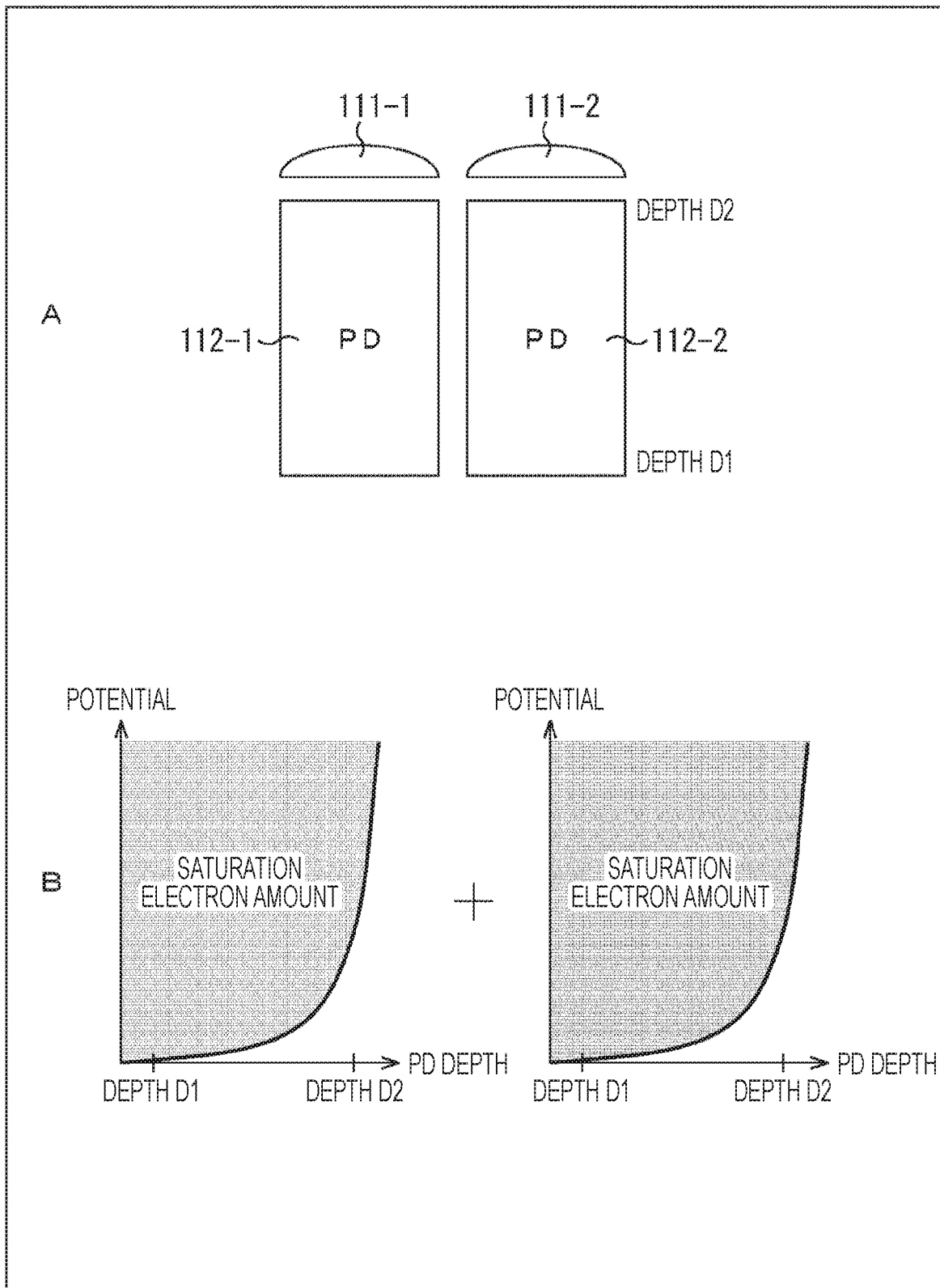
FIG. 3 is a diagram for explaining an added saturation electron amount of a divided pixel.

On the other hand, in A of FIG. 3, a cross-sectional view is illustrated of the structure in a case where the photodiode 112 (A of FIG. 2) is divided into two, a photodiode 112-1 and a photodiode 112-2. Here, an on-chip lens 111-1 is formed for the photodiode 112-1, and an on-chip lens 111-2 is formed for the photodiode 112-2.

Furthermore, in B of FIG. 3, as the saturation electron amount (Qs), where the horizontal axis is the PD depth and the vertical axis is the potential, a saturation electron amount of the photodiode 112-1 (A of FIG. 3) is illustrated on the left side, and a saturation electron amount of the photodiode 112-2 (A of FIG. 3) is illustrated on the right side. However, as the depth of the photodiode 112-1 and the photodiode 112-2, the depth of the surface opposite to the light incident surface is represented by the depth D1, and the depth of the light incident surface is represented by the depth D2.

Here, a saturation electron amount is considered that is obtained by adding the saturation electron amount of the photodiode 112-1 and the saturation electron amount of the photodiode 112-2 (hereinafter referred to as an added saturation electron amount). In other words, if the saturation electron amount of the photodiode 112 as a single pixel illustrated in B of FIG. 2 is compared with the added saturation electron amount of the photodiode 112-1 and the photodiode 112-2 as the divided pixels illustrated in B of FIG. 3, a relationship of the following formula (1) is established.

Added saturation electron amount of the divided pixels>saturation electron amount of the single pixel (1)

Because of such a relationship, for example, in a case where a pixel having a size of 2 μm is manufactured, the added saturation electron amount of divided pixels having a size of 1 μm is larger than the saturation electron amount of a single pixel having the size of 2 μm. Therefore, it is only required to adopt the structure of the divided pixels to increase the saturation electron amount with pixels of the same size and manufacture high sensitivity pixels.

Figure 4:
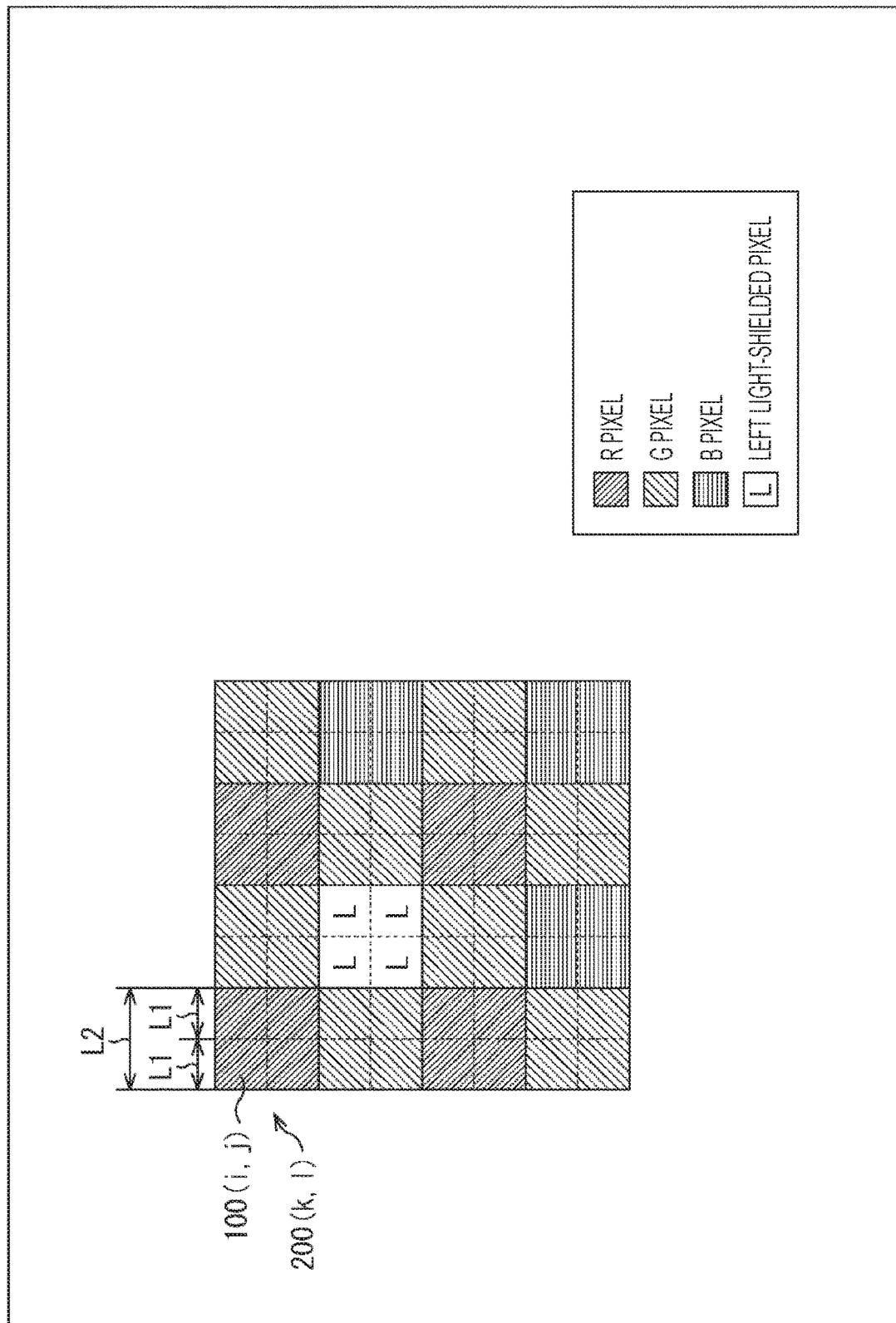
FIG. 4 is a diagram for explaining a structure of pixels to which the technology according to the present disclosure is applied.

Here, as the structure of the divided pixels, for example, a structure can be used as illustrated in FIG. 4. In other words, as illustrated in FIG. 4, in a case where a color pixel whose size of one side is L2=2 μm is arranged, it is possible to increase the saturation electron amount by arranging four divided pixels of the same color whose size of one side is L1=1 μm. In other words, it can be said here that a pixel group including four neighboring pixels (2×2 pixels) of the same color is configured as shared pixels that share a pixel circuit.

Note that, in FIG. 4, a row i and a column j of the pixels 100 arrayed in the pixel array unit 11 is represented as a pixel 100(i, j), and a row k and a column l of the pixel groups 200 each including the four neighboring pixels (2×2 pixels) of the same color is represented as a pixel group 200(k, l).

Furthermore, in the following description, an R pixel represents a pixel on which the red (R) color filter is provided as a color filter and in which charges corresponding to red (R) component light are obtained from light transmitted through the R color filter. Furthermore, a G pixel represents a pixel in which charges corresponding to green (G) component light are obtained from light transmitted through the green (G) color filter. Furthermore, a B pixel represents a pixel in which charges corresponding to blue (B) component light are obtained from light transmitted through the blue (B) color filter.

For example, in the pixel array of eight rows and eight columns in the pixel array unit 11 illustrated in FIG. 4, if the arrangement position of the upper left pixel 100 is represented as a pixel 100(1, 1), an R pixel group 200(1, 3) includes four red (R) pixels (shared pixels) of an R pixel 100(1, 5), an R pixel 100(1, 6), an R pixel 100(2, 5), and an R pixel 100(2, 6).

Furthermore, a G pixel group 200(1, 4) includes four green (G) pixels (shared pixels) of a G pixel 100(1, 7), a G pixel 100(1, 8), a G pixel 100(2, 7), and a G pixel 100(2, 8). Moreover, a G pixel group 200(2, 3) includes four green (G) pixels (shared pixels) of a G pixel 100(3, 5), a G pixel 100(3, 6), a G pixel 100(4, 5), and a G pixel 100(4, 6).

Furthermore, a B pixel group 200(2, 4) includes four blue (B) pixels (shared pixels) of a B pixel 100(3, 7), a B pixel 100(3, 8), a B pixel 100(4, 7), and a B pixel 100 (4, 8).

As described above, in the pixel array unit 11, the R pixel groups 200 each including the four red (R) pixels (2×2 pixels), the G pixel groups 200 each including the four green (G) pixels (2×2 pixels), and the B pixel groups 200 each including the four blue (B) pixels (2×2 pixels) are regularly arrayed, and a Bayer array is formed.

Note that, the Bayer array is an array pattern in which the G pixels of green (G) are arranged in a checkered pattern, and in remaining portions, the R pixels of red (R) and the B pixels of blue (B) are arranged alternately in each row.

Then, since the four R pixels 100 configuring each of the R pixel groups 200 are configured as shared pixels that share a pixel circuit, pixel signals (analog signals) obtained from the four R pixels 100 are added together in a floating diffusion region (FD), and an R component signal (R pixel signal) is generated.

Similarly, in each of the G pixel groups 200, pixel signals (analog signals) obtained from the four G pixels 100 being shared pixels that share a pixel circuit are added together, and a G component signal (G pixel signal) is generated. Furthermore, similarly, in each of the B pixel groups 200, pixel signals (analog signals) obtained from the four B pixels 100 being shared pixels that share a pixel circuit are added together, and a B component signal (B pixel signal) is generated.

Figure 5:
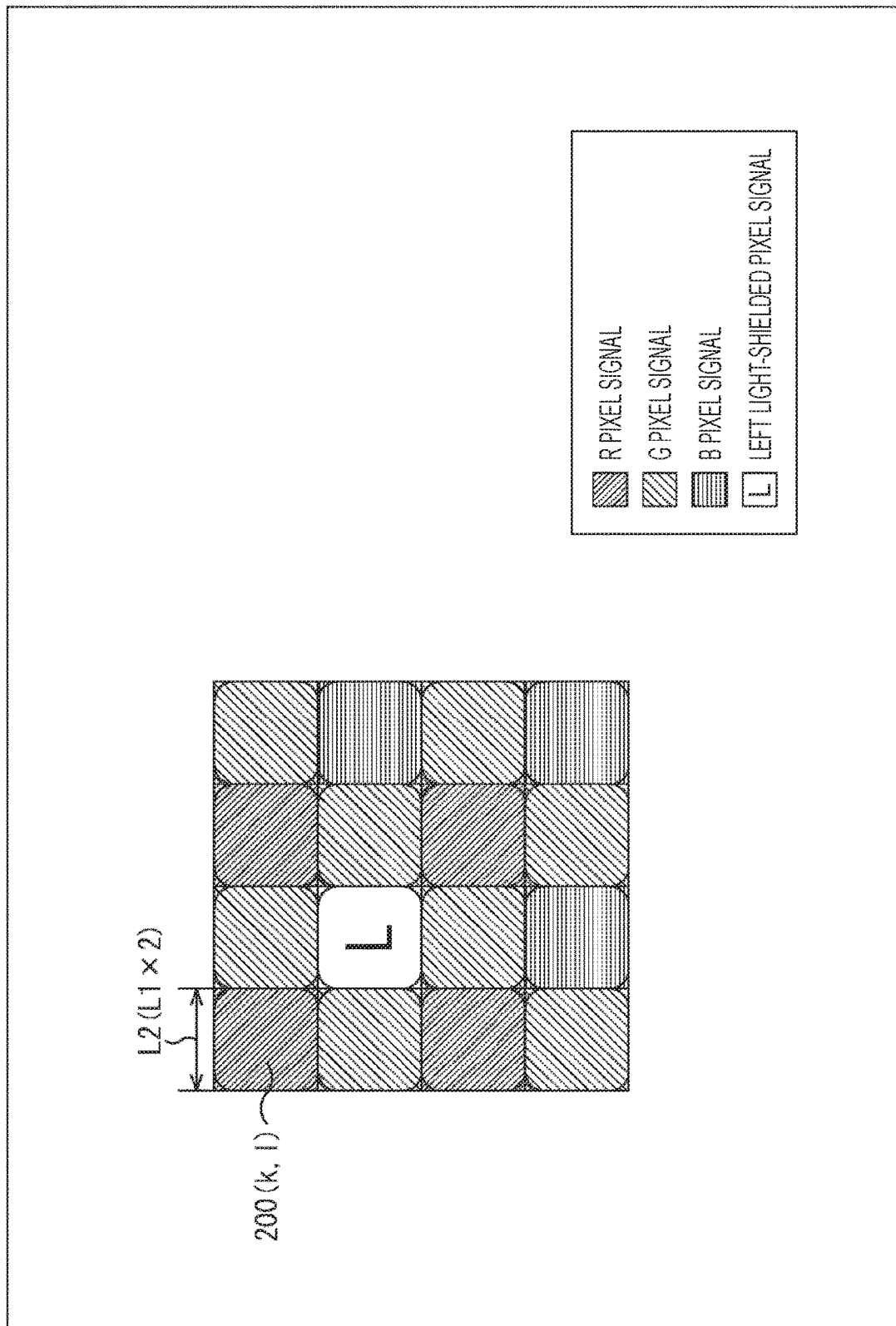
FIG. 5 is a diagram for explaining an analog signal addition processing.

As a result, as illustrated in FIG. 5, among the pixel groups 200 arranged in the Bayer array, the R pixel signal in which the pixel signals for four pixels are added together is obtained from each of the R pixel groups 200, the G pixel signal in which the pixel signals for four pixels are added together is obtained from each of the G pixel groups 200, and the B pixel signal in which the pixel signals for four pixels are added together is obtained from each of the B pixel groups 200.

Referring back to FIG. 4, here, in the pixel array unit 11, if attention is paid to a region where a pixel group 200(2, 2) is arranged, if it is the Bayer array, normally, a B pixel group 200(2, 2) should be arranged, but here, a left light-shielded pixel group 200(2, 2) is arranged. The left light-shielded pixel group 200 includes four left light-shielded pixels 100 being shared pixels that share a pixel circuit, and pixel signals for four pixels are added together, whereby a left light-shielded pixel signal is obtained as illustrated in FIG. 5. Here, the left light-shielded pixels 100 are pixels each being shielded in the left region from the light in a case where it is viewed from the light incident side.

Note that, as will be described later in detail, in the pixel array unit 11, right light-shielded pixel groups 200 each including the right light-shielded pixels 100 that are pixels each being shielded in the right region from the light are arranged together with the left light-shielded pixels 100 to be scattered in a repeating pattern. In each of the right light-shielded pixel groups 200, pixel signals for four pixels are added together, whereby a right light-shielded pixel signal is obtained. Then, a phase difference between two images is detected on the basis of the left light-shielded pixel signal and the right light-shielded pixel signal thus obtained.

(Planar Layout of Pixels)

Figure 6:
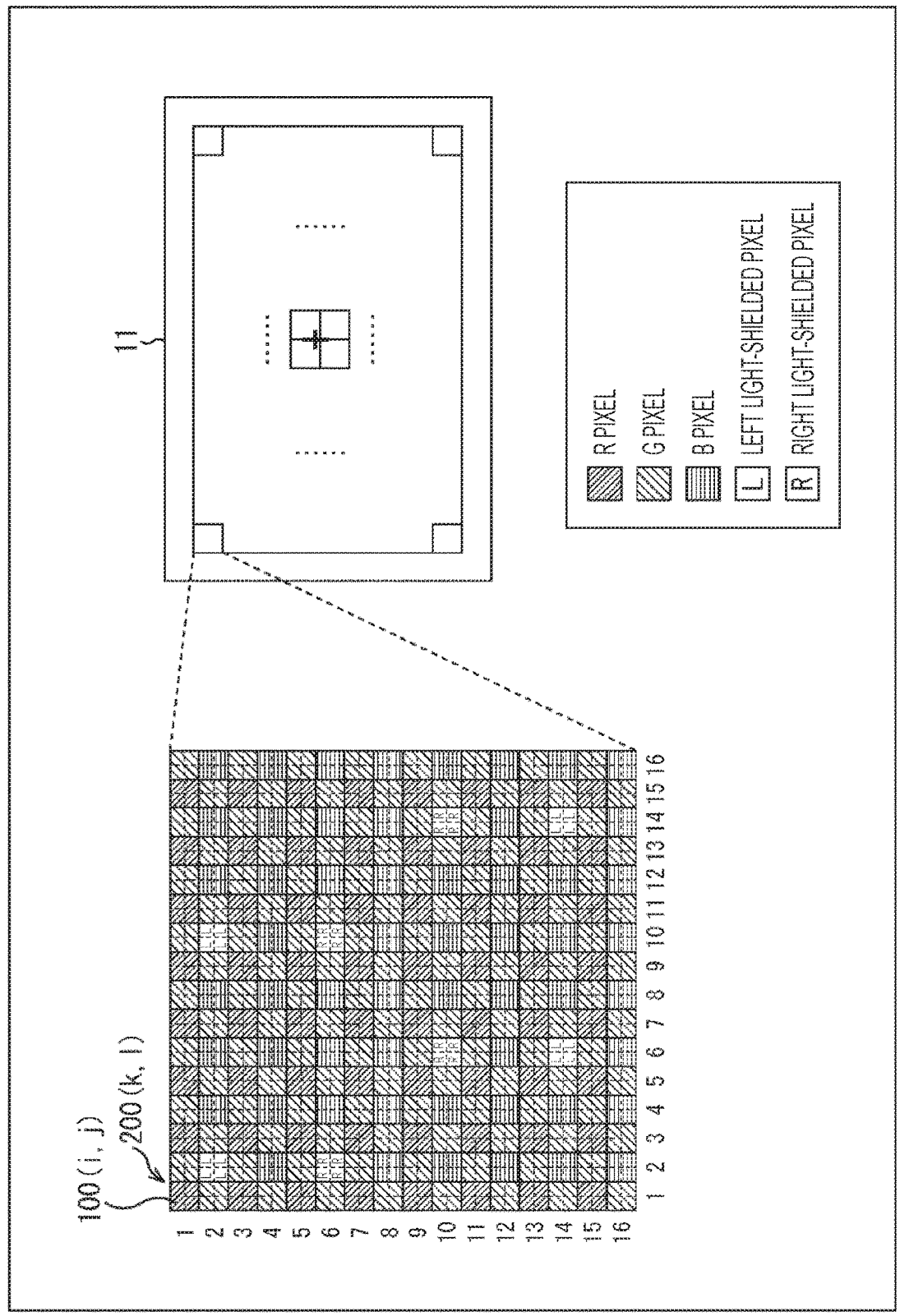
FIG. 6 is a diagram illustrating a planar layout of a plurality of pixels arrayed in a pixel array unit.

FIG. 6 is a diagram illustrating a planar layout of the plurality of pixels 100 arrayed in the pixel array unit 11.

In FIG. 6, among the plurality of pixels 100 two-dimensionally arrayed in the pixel array unit 11, the pixels 100 are illustrated of a region of 64 rows and 64 columns arrayed in the upper left region as viewed from the light incident side. Here, four neighboring pixels of the same color configure each of the pixel groups 200 of the same color. Note that, in the planar layout of FIG. 6, the row numbers and the column numbers corresponding to the row k and the column l of the pixel groups 200 are illustrated to facilitate understanding of the description.

In other words, in the pixel array unit 11 of FIG. 6, the R pixel groups 200 each including the four red (R) pixels (2×2 pixels), the G pixel groups 200 each including the four green (G) pixels (2×2 pixels), and the B pixel groups 200 each including the four blue (B) pixels (2×2 pixels) are regularly arrayed, and the Bayer array is formed.

Furthermore, if attention is paid to the region where the pixel group 200(2, 2) is arranged, the left light-shielded pixel group 200(2, 2) is arranged instead of the B pixel group 200(2, 2).

Figure 7:
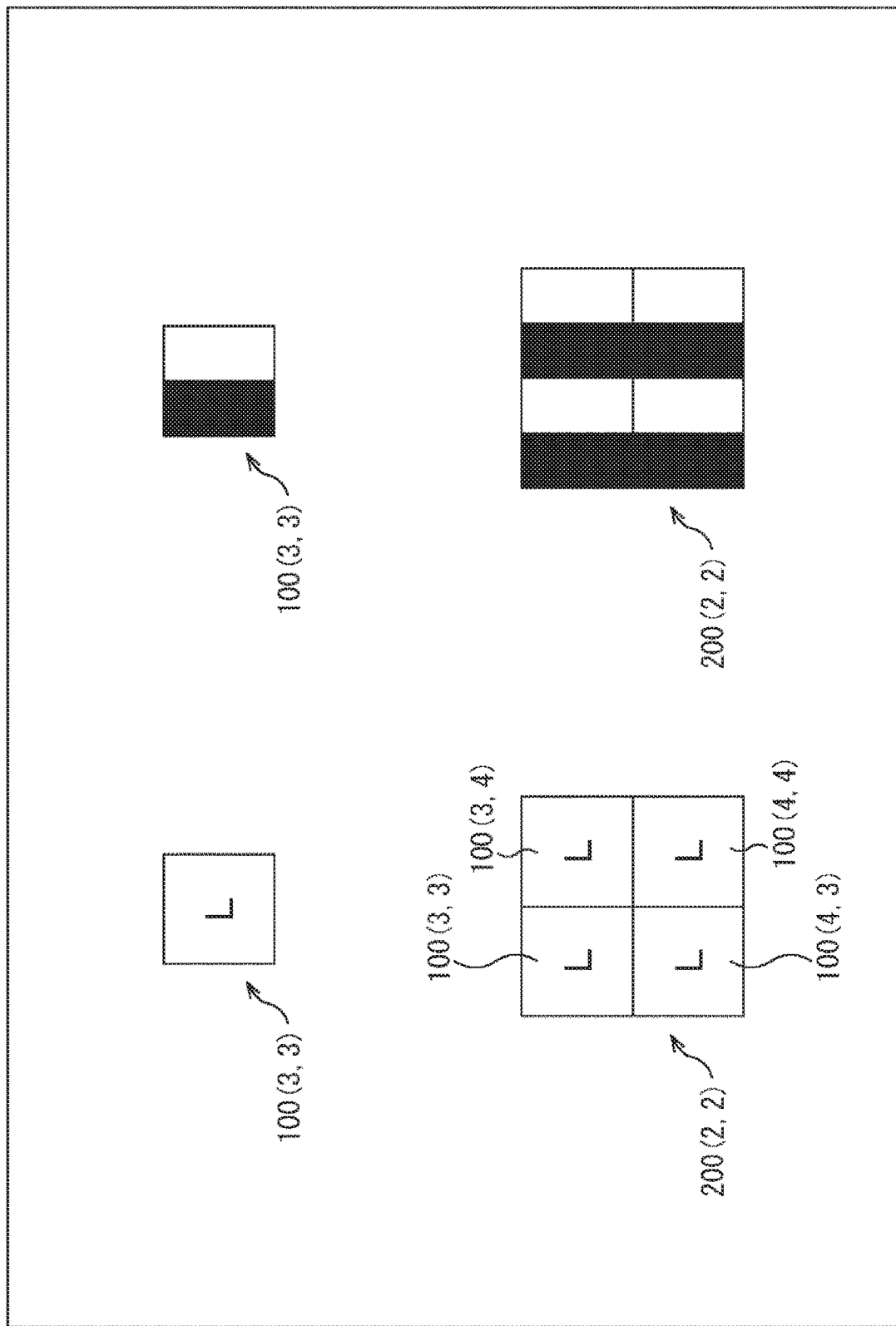
FIG. 7 is a diagram illustrating an example of a structure of a left light-shielded pixel group.

Here, as illustrated in FIG. 7, the left light-shielded pixel group 200(2, 2) includes four pixels (shared pixels) of a left light-shielded pixel 100(3, 3), a left light-shielded pixel 100(3, 4), a left light-shielded pixel 100(4, 3), and a left light-shielded pixel 100(4, 4).

For example, in the left light-shielded pixel 100(3, 3), in a case where it is viewed from the light incident side, the left region (the region indicated in black in the figure) is shielded from the light. Furthermore, also in the left light-shielded pixel 100(3, 4), the left light-shielded pixel 100(4, 3), and the left light-shielded pixel 100(4, 4), similarly to the left light-shielded pixel 100(3, 3), the left region (region indicated in black in the figure) is shielded from the light.

In other words, in the left light-shielded pixel group 200(2, 2) including these four left light-shielded pixels 100, the left light-shielded pixel 100(3, 3), the left light-shielded pixel 100(3, 4), the left light-shielded pixel 100(4, 3), and the left light-shielded pixel 100(4, 4) are all shielded in the left region from the light, and shielded in the same direction from the light (the same direction side is shielded from the light).

Referring back to FIG. 6, in the pixel array unit 11, in a pixel group 200(2, 10), a pixel group 200(14, 6), and a pixel group 200(14, 14), similarly to the pixel group 200(2, 2), the left light-shielded pixel groups 200 are arranged instead of the B pixel groups 200.

Then, in a left light-shielded pixel group 200(2, 10), a left light-shielded pixel group 200(14, 6), and a left light-shielded pixel group 200(14, 14), similarly to the left light-shielded pixel group 200(2, 2), the left region of each of the four left light-shielded pixels 100 is shielded from the light, and shielded in the same direction from the light (the same direction side is shielded from the light).

Furthermore, if attention is paid to a region where a pixel group 200(6, 2) is arranged, a right light-shielded pixel group 200(6, 2) is arranged instead of a B pixel group 200(6, 2).

Figure 8:
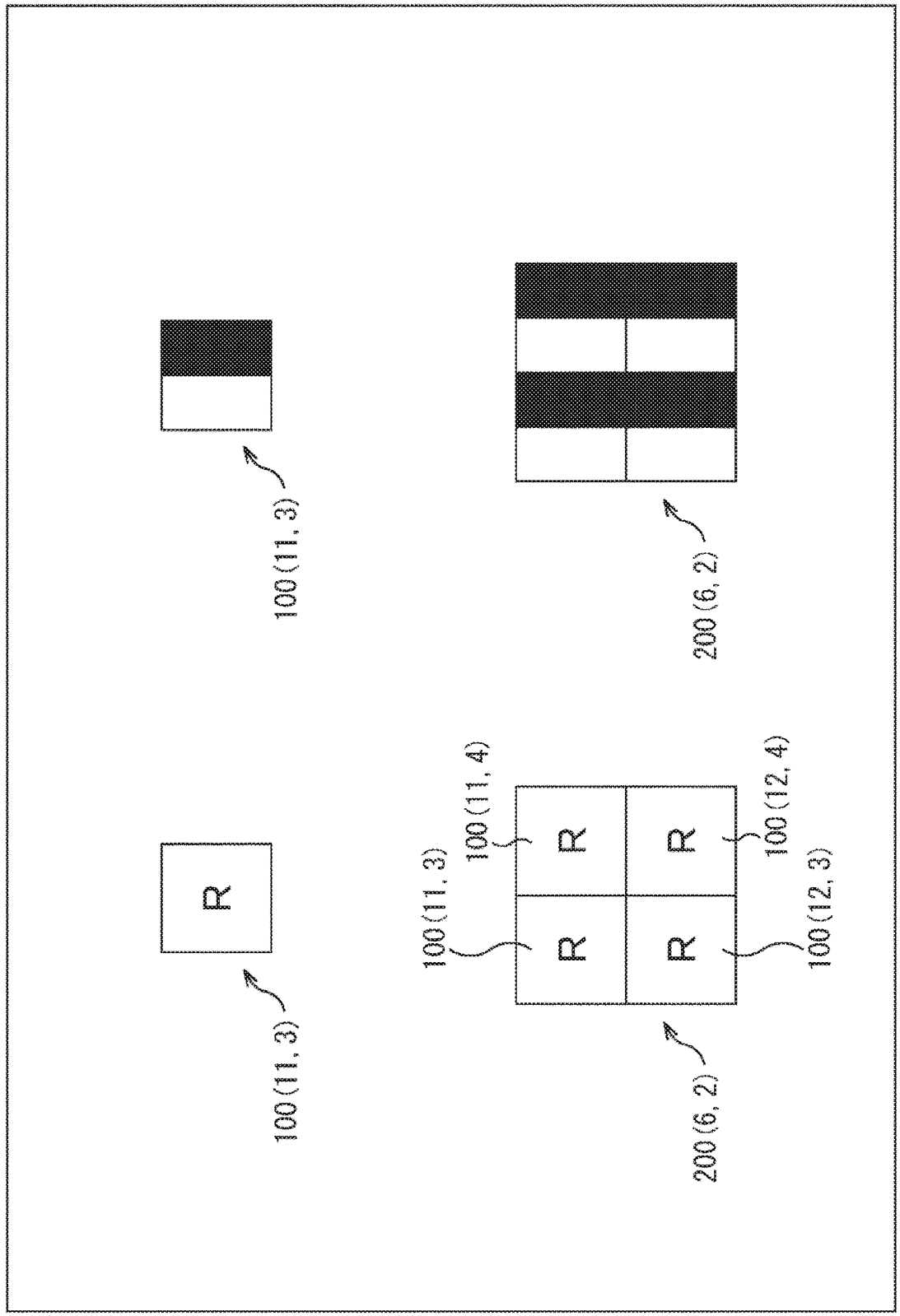
FIG. 8 is a diagram illustrating an example of a structure of a right light-shielded pixel group.

Here, as illustrated in FIG. 8, the right light-shielded pixel group 200(6, 2) includes four pixels (shared pixels) of a right light-shielded pixel 100(11, 3), a right light-shielded pixel 100(11, 4), a right light-shielded pixel 100(12, 3), and a right light-shielded pixel 100(12, 4).

For example, in the right light-shielded pixel 100(11, 3), in a case where it is viewed from the light incident side, the right region (the region indicated in black in the figure) is shielded from the light. Furthermore, also in the right light-shielded pixel 100(11, 4), the right light-shielded pixel 100(12, 3), and the right light-shielded pixel 100(12, 4), similarly to the right light-shielded pixel 100(11, 3), the right region (the region indicated in black in the figure) is shielded from the light.

In other words, in the right light-shielded pixel group 200(6, 2) including these four right light-shielded pixels 100, the right light-shielded pixel 100(11, 3), the right light-shielded pixel 100(11, 4), the right light-shielded pixel 100(12, 3), and the right light-shielded pixel 100(12, 4) are all shielded in the right region from the light, and shielded in the same direction from the light (the same direction side is shielded from the light).

Referring back to FIG. 6, in the pixel array unit 11, in a pixel group 200(6, 10), a pixel group 200(10, 6), and a pixel group 200(10, 14), similarly to the pixel group 200(6, 2), the right light-shielded pixel groups 200 are arranged instead of the B pixel groups 200.

Then, in a right light-shielded pixel group 200(6, 10), a right light-shielded pixel group 200(10, 6), and a right light-shielded pixel group 200(10, 14), similarly to the right light-shielded pixel group 200(6, 2), the right region of each of the four right light-shielded pixels 100 is shielded from the light, and shielded in the same direction from the light (the same direction side is shielded from the light).

As described above, in the pixel array unit 11, the R pixel groups 200 each including the four R pixels 100 of 2×2, the G pixel groups 200 each including the four G pixels 100 of 2×2, and the B pixel groups 200 each including the four B pixels 100 of 2×2 are arrayed in the Bayer array, but a part of the B pixel groups 200 is replaced with the left light-shielded pixel groups 200 or the right light-shielded pixel groups 200.

Specifically, in the pixel array unit 11, the left light-shielded pixel group 200(2, 2) and the left light-shielded pixel group 200(2, 10) are arranged in the second row, and the right light-shielded pixel group 200(6, 2) and the right light-shielded pixel group 200(6, 10) are arranged in the sixth row. Furthermore, the right light-shielded pixel group 200(10, 6) and the right light-shielded pixel group 200(10, 14) are arranged in the tenth row, and the left light-shielded pixel group 200(14, 6) and the left light-shielding pixel group 200(14, 14) are arranged in the fourteenth row.

In other words, in the pixel array unit 11, the left light-shielded pixel group 200(2, 2) and the right light-shielded pixel group 200(6, 2) are arranged in the second column, and the right light-shielded pixel group 200(10, 6) and the left light-shielded pixel group 200(14, 6) are arranged in the sixth column. Furthermore, the left light-shielded pixel group 200(2, 10) and the right light-shielded pixel group 200(6, 10) are arranged in the tenth column, and the right light-shielded pixel group 200(10, 14) and the left light-shielded pixel group 200(14, 14) are arranged in the fourteenth column.

In other words, in the pixel array unit 11, the left light-shielded pixel group 200 and the right light-shielded pixel group 200 in which light-shielded regions are symmetrical are combined as pixels for phase difference detection (phase difference pixels), and on the basis of the left light-shielded pixel signal and the right light-shielded pixel signal obtained from those left and right light-shielded pixel groups, an image for phase difference detection is generated, and the phase difference is detected.

For example, in FIG. 6, a combination of the left light-shielded pixel group 200(2, 2) and the right light-shielded pixel group 200(6, 2), a combination of the left light-shielded pixel group 200(2, 10) and the right light-shielded pixel group 200(6, 10), a combination of the left light-shielded pixel group 200(14, 6) and the right light-shielded pixel group 200(10, 6), and a combination of the left light-shielded pixel group 200(14, 14) and the right light-shielded pixel group 200(10, 14) can be a pair of the phase difference pixels.

Note that, in the pixel array unit 11 of FIG. 6, a case is illustrated where the left light-shielded pixel groups 200 and the right light-shielded pixel groups 200 are arranged instead of the B pixel groups 200; however, the left light-shielded pixel groups 200 and the right light-shielded pixel groups 200 may be arranged instead of the R pixel groups 200 or the G pixel groups 200.

Furthermore, the left light-shielded pixel groups 200 and the right light-shielded pixel groups 200 may be arranged instead of not only the same color pixel groups 200, but also the different color pixel groups 200. For example, in a case where the left light-shielded pixel groups 200 are arranged instead of the B pixel groups 200, the right light-shielded pixel groups 200 may be arranged instead of the G pixel groups 200.

Furthermore, the array pattern illustrated in FIG. 6 is an example of the arrangement of the left light-shielded pixel groups 200 and the right light-shielded pixel groups 200 arranged to be scattered in a repeating pattern in the pixel array unit 11, and the left light-shielded pixel groups 200 and the right light-shielded pixel groups 200 may be arranged in another pattern as long as the multiple left light-shielded pixel groups 200 and right light-shielded pixel groups 200 are arranged at regular intervals. Note that, in the above description, a case has been described where the color pixel groups 200 are regularly arrayed in the Bayer array in the pixel array unit 11 as an example; however, another array pattern may be adopted.

(Cross-Sectional Structure of Pixel)

Figure 9:
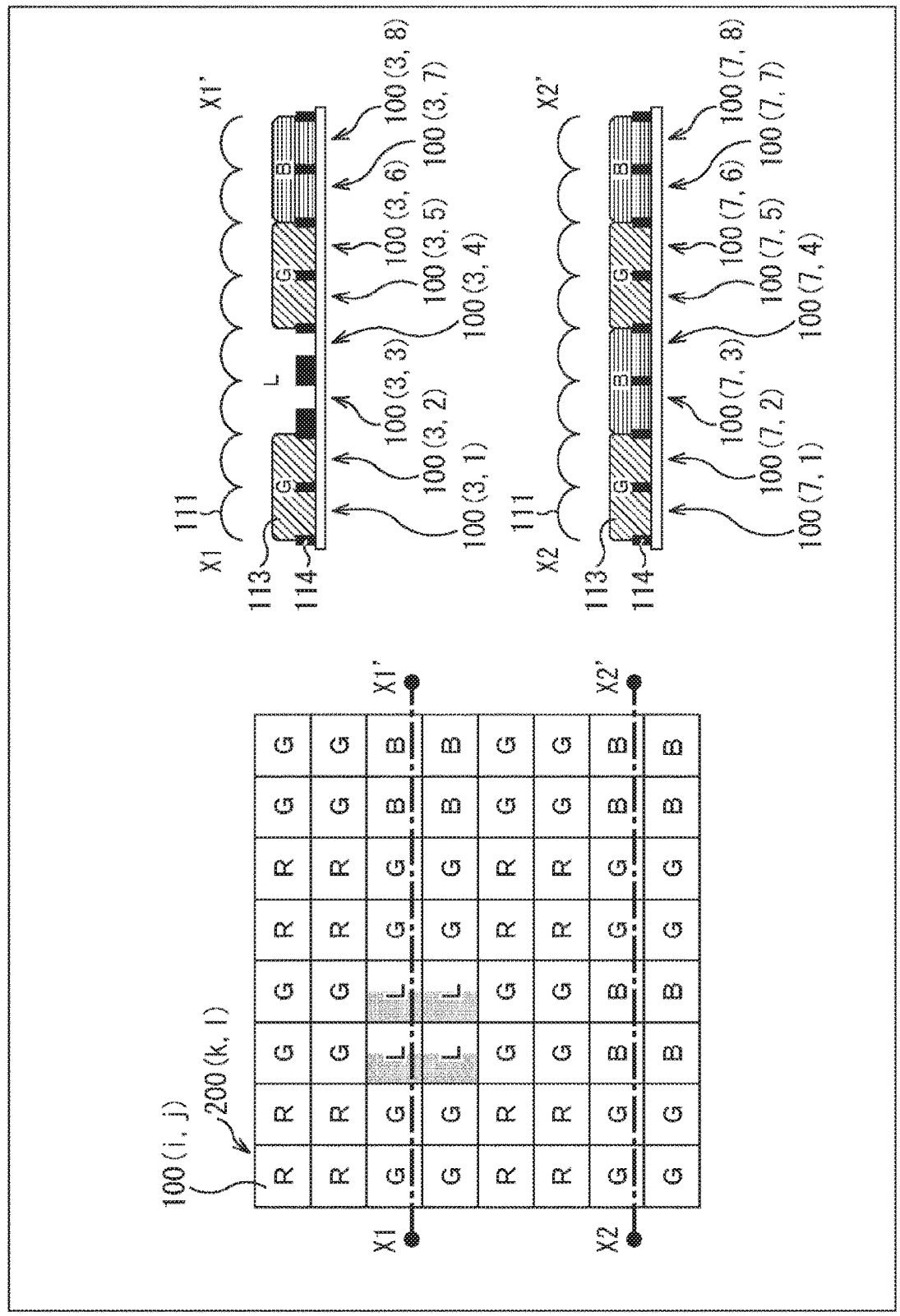
FIG. 9 is a cross-sectional view illustrating a structure of the plurality of pixels arrayed in the pixel array unit.

FIG. 9 is a cross-sectional view illustrating a structure of the plurality of pixels 100 arrayed in the pixel array unit 11.

FIG. 9 illustrates an X1-X1' cross section of the pixels 100 in the third row as a cross section of the pixel groups 200 including the left light-shielded pixel group 200. Furthermore, FIG. 9 illustrates an X2-X2' cross section of the pixels 100 in the seventh row as a cross section of the pixel groups 200 not including the left light-shielded pixel group 200 nor the right light-shielded pixel group 200.

Again, if the arrangement position of the upper left pixel 100 is represented as the pixel 100(1, 1), targets of the X1-X1' cross section are a G pixel 100(3, 1), a G pixel 100(3, 2), the left light-shielded pixel 100(3, 3), the left light-shielded pixel 100(3, 4), the G pixel 100(3, 5), the G pixel 100(3, 6), the B pixel 100(3, 7), and the B pixel 100(3, 8).

However, the G pixel 100(3, 1) and the G pixel 100(3, 2) are included in a G pixel group 200(2, 1), and the left light-shielded pixel 100(3, 3) and the left light-shielded pixel 100(3, 4) are included in the left light-shielded pixel group 200(2, 2). Furthermore, the G pixel 100(3, 5) and the G pixel 100(3, 6) are included in the G pixel group 200(2, 3), and the B pixel 100(3, 7) and the B pixel 100(3, 8) are included in the B pixel group 200(2, 4).

As illustrated in the X1-X1' cross section of FIG. 9, in each of the pixels 100, the photodiode 112 (not illustrated) is formed immediately below the on-chip lens 111, and in a region between the on-chip lens 111 and a silicon layer in which the photodiode 112 is formed, a color filter 113 and a light shielding portion 114 are provided.

On the G pixel 100(3, 1) and the G pixel 100(3, 2), and the G pixel 100(3, 5) and the G pixel 100(3, 6), a G color filter 113 is formed, and on the B pixel 100(3, 7) and the B pixel 100(3, 8), a B color filter 113 is formed.

On the left light-shielded pixel 100(3, 3) and the left light-shielded pixel 100(3, 4), the color filter 113 is not formed, and light collected by the on-chip lens 111 is directly incident on the photodiode 112. In other words, it can also be said that the left light-shielded pixels 100 are W pixels corresponding to white (W) component light, and the left light-shielded pixel groups 200 each include the four left light-shielded pixels 100 that are the white (W) pixels (pixels of the same color).

Furthermore, the G pixel 100(3, 1) of a square unit is shielded at borders with adjacent pixels from the light by the light shielding portion 114 provided in a square lattice shape as viewed from the light incident side. The light shielding portion 114 is formed of a metal such as tungsten (W) or aluminum (Al), for example.

Similarly to the G pixel 100(3, 1), the G pixel 100(3, 2), the left light-shielded pixel 100(3, 3), the left light-shielded pixel 100(3, 4), the G pixel 100(3, 5), the G pixel 100(3, 6), the B pixel 100(3, 7), and the B pixel 100(3, 8) are also shielded at borders with adjacent pixels from the light by the light shielding portion 114 provided in a square lattice shape as viewed from the light incident side.

Here, in the left light-shielded pixel 100(3, 3) and the left light-shielded pixel 100(3, 4), the light shielding portion 114 not only shields the light at borders with adjacent pixels but also is extended to the light incident surface side to shield the light in the left region, and an incident surface of the light incident on the photodiode 112 is narrowed compared to other pixels. As a result, as illustrated in FIG. 7, the left light-shielded pixel 100(3, 3) and the left light-shielded pixel 100(3, 4) are shielded in the left region from the light by the light shielding portion 114 in a case where it is viewed from the light incident side.

On the other hand, targets of the X2-X2' cross section is a G pixel 100(7, 1), a G pixel 100(7, 2), a B pixel 100(7, 3), a B pixel 100(7, 4), a G pixel 100(7, 5), a G pixel 100(7, 6), a B pixel 100(7, 7), and a B pixel 100(7, 8).

On the G pixel 100(7, 1) and the G pixel 100(7, 2), and the G pixel 100(7, 5) and the G pixel 100(7, 6), the G color filter 113 is formed, and on the B pixel 100(7, 3) and the B pixel 100(7, 4), and the B pixel 100(7, 7) and the B pixel 100(7, 8), the B color filter 113 is formed.

The G pixel 100(7, 1), the G pixel 100(7, 2), the B pixel 100(7, 3), the B pixel 100(7, 4), the G pixel 100(7, 5), the G pixel 100(7, 6), the B pixel 100(7, 7), and the B pixel 100(7, 8) are shielded at borders with adjacent pixels from the light by the light shielding portion 114 provided in a square lattice shape as viewed from the light incident side.

Note that, although not illustrated, in the cross section of the right light-shielded pixels 100, similarly to the left light-shielded pixels 100 described above, the light shielding portion 114 not only shields the light at borders with adjacent pixels but also is extended to the light incident surface side, and an incident surface of the light incident on the photodiode 112 is narrowed, whereby the right region is shielded from the light. As a result, as illustrated in FIG. 8, in the right light-shielded pixels 100, the right region is shielded from the light by the light shielding portion 114 in a case where it is viewed from the light incident side.

As described above, the left light-shielded pixel groups 200 to which the present technology is applied each include the four left light-shielded pixels 100 arranged that are pixels each being shielded in the left region from the light in a case where it is viewed from the light incident side, and those four left light-shielded pixels 100 are all shielded in the same direction from the light. Furthermore, the right light-shielded pixel groups 200 to which the present technology is applied each include the four right light-shielded pixels 100 arranged that are pixels each being shielded in the right region from the light in a case where it is viewed from the light incident side, and those four right light-shielded pixels 100 are all shielded in the same direction from the light.

As described above, as the light-shielded pixel group in which all the four neighboring pixels are shielded in the same direction from the light, the left light-shielded pixel group 200 and the right light-shielded pixel group 200 in which the light-shielded regions are symmetrical are provided, whereby the left light-shielded pixel group 200 and the right light-shielded pixel group 200 form a combination of the phase difference pixels, and the phase difference can be detected.

Here, as illustrated in the cross-sectional view of FIG. 9 and the like, the left light-shielded pixels 100 configuring the left light-shielded pixel group 200, and the right light-shielded pixels 100 configuring the right light-shielded pixel group 200 each have a structure in which one photodiode 112 is provided for one on-chip lens 111, similarly to other color pixels.

Therefore, in a case where an array pattern is adopted in which shared pixels including neighboring pixels (four pixels) of the same color are regularly arrayed, even when the phase difference pixels are provided, the size of the on-chip lens 111 of the phase difference pixels (light-shielded pixels) can be made the same as the size of the on-chip lens 111 of the other color pixels (R pixel, G pixel, and B pixel). Furthermore, the phase difference pixels (light-shielded pixels) are configured as shared pixels including neighboring pixels (four pixels) of the same color, similarly to the other color pixels (normal pixels), so that the driving method does not have to be changed.

Therefore, in the pixel array unit 11, the light-shielded pixels (the left light-shielded pixel group 200 and the right light-shielded pixel group 200) are arranged to which the present technology is applied, whereby it is not necessary to partially change the structure of each of the pixels 100, and the phase difference pixels can be provided with a lower degree of difficulty in manufacturing.

(Analog Addition Processing)

Next, with reference to FIGS. 10 and 11, details will be described of processing for adding pixel signals (analog signals) obtained from the four pixels (shared pixels) configuring each of the pixel groups 200.

Figure 10:
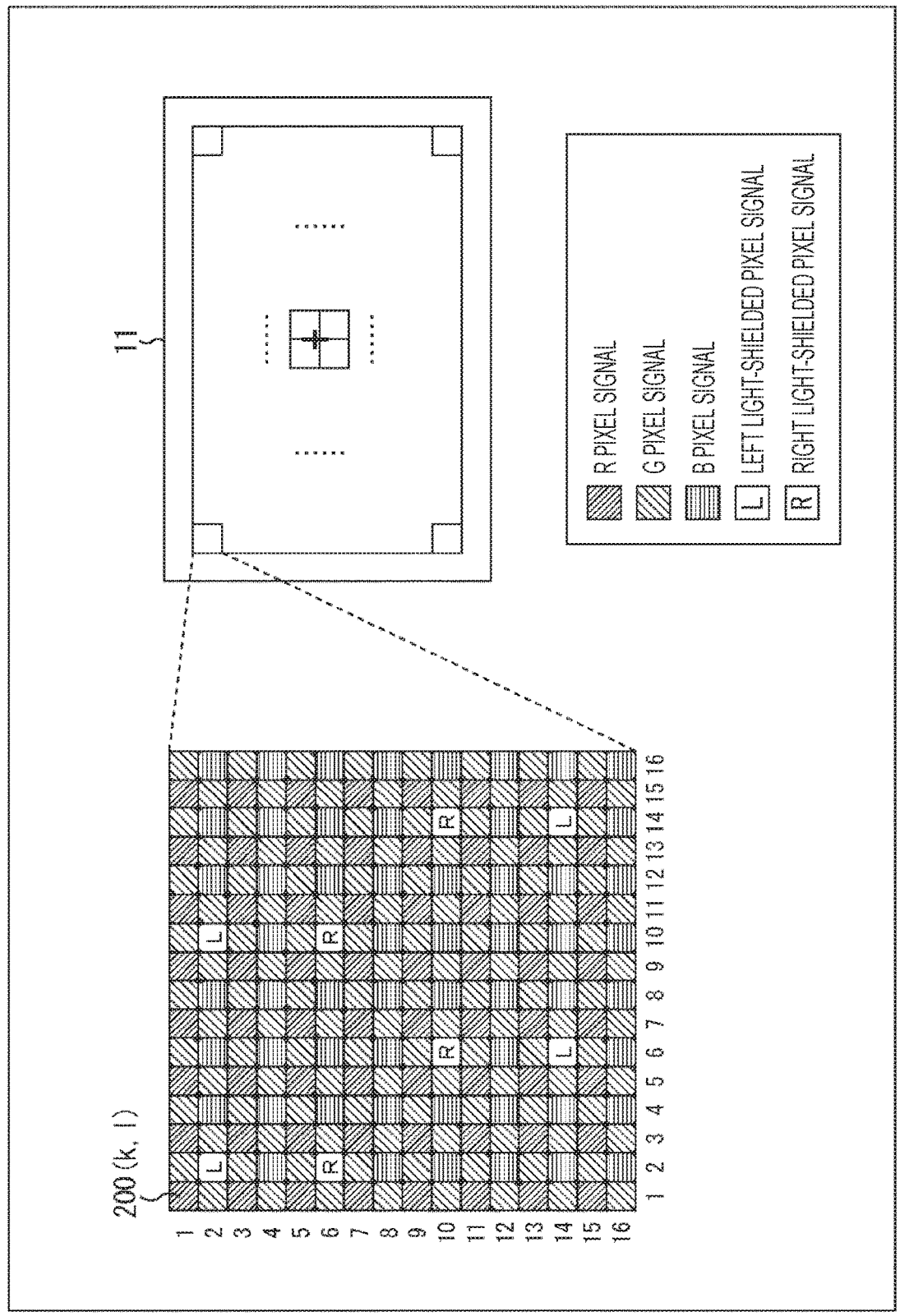
FIG. 10 is a diagram illustrating an example of a pixel signal obtained by the analog signal addition processing.

FIG. 10 is a diagram illustrating an example of the pixel signal obtained by the analog signal addition processing. Note that, in the planar layout of FIG. 10, the row numbers and the column numbers corresponding to the row k and the column 1 of the pixel groups 200 are illustrated in correspondence with the planar layout of FIG. 6.

In the pixel array unit 11, the four pixels 100 of the same color configuring each of the pixel groups 200 share a floating diffusion region (FD).

Therefore, in the pixel array unit 11, among the pixel groups 200 arranged in the Bayer array, in each of the R pixel groups 200, the charges generated by the respective photodiodes 112 of the four R pixels 100 are transferred to one floating diffusion region (FD) and added together (analog addition), and an R pixel signal is output corresponding to a signal voltage obtained as a result.

Furthermore, in each of the G pixel groups 200, the charges generated by the respective photodiodes 112 of the four G pixels 100 are added together in one floating diffusion region (FD), and a G pixel signal is output. Moreover, in each the B pixel groups 200, the charges generated by the respective photodiodes 112 of the four B pixels 100 are added together in one floating diffusion region (FD), and a B pixel signal is output.

Furthermore, in each of the left light-shielded pixel groups 200, the charges generated by the respective photodiodes 112 of the four left light-shielded pixels 100 are added together in one floating diffusion region (FD), and a left light-shielded pixel signal is output. Moreover, in each of the right light-shielded pixel groups 200, the charges generated by the respective photodiodes 112 of the four right light-shielded pixels 100 are added together in one floating diffusion region (FD), and a right light-shielded pixel signal is output.

Here, the left light-shielded pixel group 200 and the right light-shielded pixel group 200 in which the light-shielded regions are symmetrical form a combination of the phase difference pixels, and an image for phase difference detection is generated on the basis of the left light-shielded pixel signal and the right light-shielded pixel signal, whereby the phase difference can be detected.

Furthermore, among the pixel groups 200 arranged in the Bayer array, on a region where the left light-shielded pixel group 200 or the right light-shielded pixel group 200 is arranged, an interpolation processing is performed on the basis of information of other neighboring color pixels 100, whereby an R pixel signal, a G pixel signal, or a B pixel signal is obtained. As a result, an R pixel signal, a G pixel signal, and a B pixel signal are obtained corresponding to the Bayer array.

Here, the pixel groups 200 arranged in the Bayer array each have a structure including four pixels that share a floating diffusion region (FD), in other words, a structure in which a pixel is divided and a saturation electron amount (Qs) obtained from the divided pixel are added together. Therefore, as described with reference to FIGS. 2 and 3 above, in each of the pixel groups 200, the saturation electron amount (Qs) can be increased compared to a structure including a pixel of the same size not divided.

Figure 11:
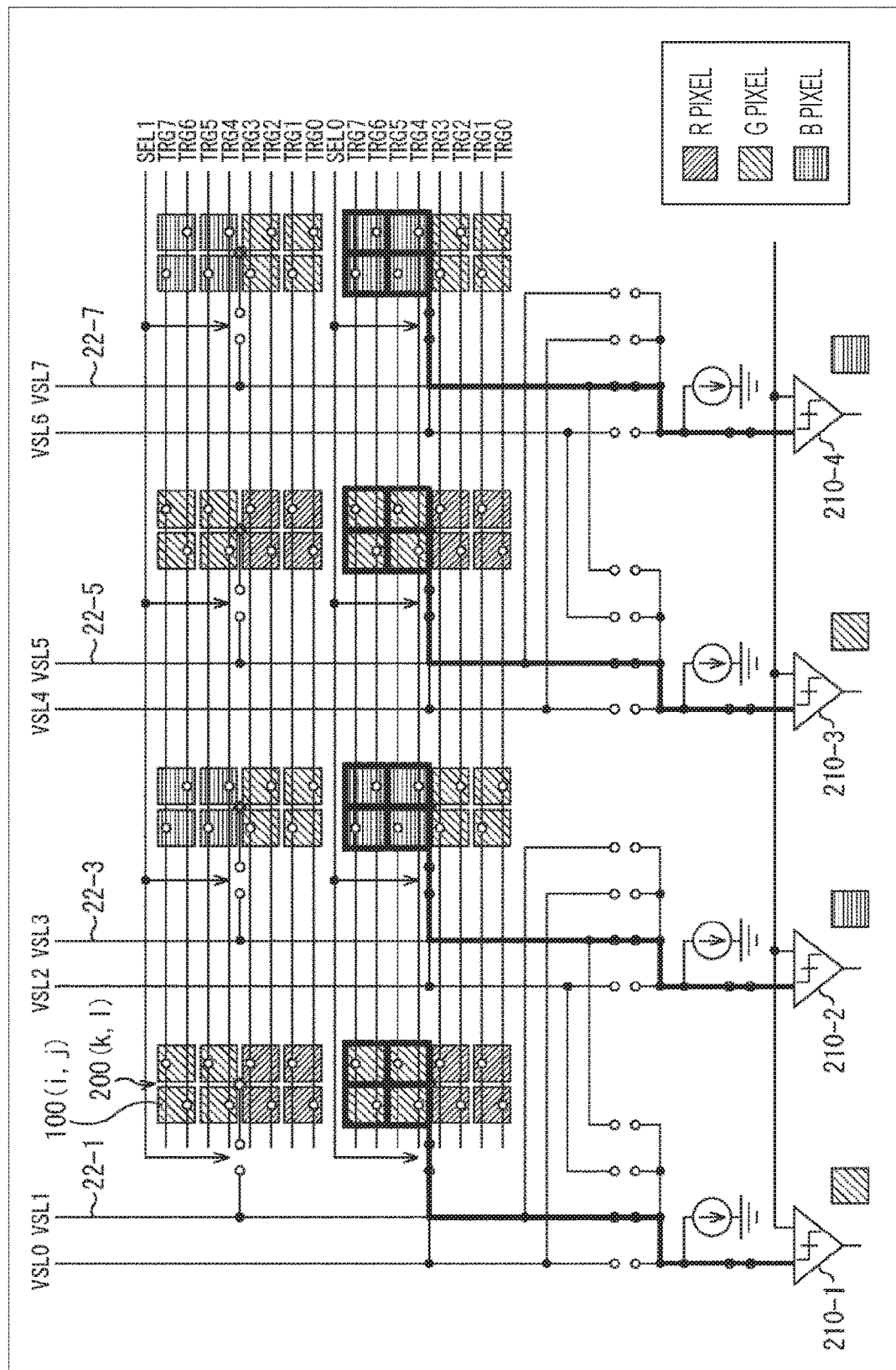
FIG. 11 is a circuit diagram illustrating a configuration of the pixels to which the technology according to the present disclosure is applied.

FIG. 11 is a circuit diagram illustrating a configuration of the pixels to which the technology according to the present disclosure is applied.

FIG. 11 illustrates a partial region of a pixel region in which the pixels 100 are arrayed in the pixel array unit 11, and the four pixels 100 of the same color configure each of the pixel groups 200. In FIG. 11, the four pixels 100 of the same color configuring the pixel group 200 share a floating diffusion region (FD). Furthermore, in FIG. 11, drive signals (SEL, TRG) for the transfer transistor and the selection transistor are supplied from the vertical drive circuit 12 (FIG. 1).

In the pixel groups 200, each of the pixels 100 includes the transfer transistor in addition to the photodiode 112. In each of the pixels 100, the transfer transistor performs on/off operation in accordance with the drive signal TRG input to the gate of the transfer transistor, whereby charges (signal charges) photoelectrically converted by the photodiode 112 are transferred to the floating diffusion region (FD) shared by the four pixels.

The floating diffusion region (FD) is formed at a connection point between the transfer transistor of each of the pixels 100 and the reset transistor and amplification transistor shared by each of the pixel groups 200. The reset transistor performs on/off operation in accordance with a drive signal RST input to the gate of the reset transistor, whereby the charges accumulated in the floating diffusion region (FD) is discharged.

The floating diffusion region (FD) has a function of accumulating the charges transferred by the transfer transistor of each of the pixels 100. A potential of the floating diffusion region (FD) is modulated depending on an amount of the charges accumulated. The amplification transistor operates as an amplifier that uses a potential fluctuation of the floating diffusion region (FD) connected to the gate of the amplification transistor as an input signal voltage, and its output signal voltage is output to the vertical signal line (VSL) 22 via the selection transistor.

The selection transistor performs on/off operation in accordance with the drive signal SEL input to the gate of the selection transistor, thereby outputting a voltage signal from the amplification transistor to the vertical signal line (VSL) 22.

As described above, the pixel groups 200 each include the four shared pixels, and the pixels 100 each include the photodiode 112 and the transfer transistor. Furthermore, in each of the pixel groups 200, the floating diffusion region (FD) is shared by the four pixels (shared pixels), and as a pixel circuit of the shared pixels, the reset transistor, the amplification transistor, and the selection transistor are configured as shared transistors.

Note that, in the pixel array unit 11, the shared transistors including the reset transistor, the amplification transistor, and the selection transistor are shared by the two pixel groups 200 in the column direction.

More specifically, in the pixel array in the pixel array unit 11 illustrated in FIG. 11, if the arrangement position of the upper left pixel 100 is represented as the pixel 100(1, 1), in the pixel groups 200 in the first row and the second row, the floating diffusion region (FD) is shared by the pixel groups 200, and the upper and lower pixel groups 200 in the column direction form a combination, and the shared transistors are also shared.

For example, a G pixel group 200(1, 1) and an R pixel group 200(2, 1) in the first column form a combination, and the reset transistor, the amplification transistor, and the selection transistor are shared transistors.

Here, among the four pixels configuring the G pixel group 200(1, 1), in a G pixel 100(1, 1), the transfer transistor is operated in accordance with a drive signal TRG6, whereby the charges generated by the photodiode 112 are transferred to the floating diffusion region (FD). Similarly, also in a G pixel 100(1, 2), a G pixel 100(2, 1), and a G pixel 100(2, 2), in accordance with a drive signal TRG7, a drive signal TRG4, and a drive signal TRG5, the charges from the photodiode 112 are transferred to the floating diffusion region (FD) by the transfer transistor.

In the floating diffusion region (FD) shared by the four pixels configuring the G pixel group 200(1, 1), the charges transferred from the respective photodiodes 112 of the G pixel 100(1, 1), the G pixel 100(1, 2), the G pixel 100(2, 1), and the G pixel 100(2, 2) are added together (analog addition), and a voltage corresponding to the added charges is input to the amplification transistor. Note that, the addition of the charges in the floating diffusion region (FD) is also referred to as FD addition.

Then, in the amplification transistor, the potential fluctuation of the floating diffusion region (FD) shared by the four pixels is used as the input signal voltage to the gate, and its output signal voltage is output to the vertical signal line 22-1 (VSL1) via the selection transistor.

Note that, the shared transistors such as the amplification transistor and the selection transistor are shared by the G pixel group 200(1, 1) and the R pixel group 200(2, 1) that are combined with each other.

Furthermore, in the pixel groups 200 in the first row and the second row, a combination of a B pixel group 200(1, 2) and a G pixel group 200(2, 2) in the second column, a combination of a G pixel group 200(1, 3) and an R pixel group 200(2, 3) in the third column, and a combination of a B pixel group 200(1, 4) and a G pixel group 200(2, 4) in the fourth column are configured similarly to the G pixel group 200(1, 1) and the R pixel group 200(2, 1) in the first column.

Furthermore, the pixel groups 200 in the third row and the fourth row are configured similarly to the pixel groups 200 in the first row and the second row, and the floating diffusion region (FD) is shared by the pixel groups 200, and the upper and lower pixel groups 200 in the column direction form a combination, and the shared transistors are also shared.

Here, in FIG. 11, a drive signal SEL1 becomes an L level and the selection transistor shared by the pixel groups 200 in the first row and the second row is turned off, while a drive signal SEL0 becomes an H level and the selection transistor shared by the pixel groups 200 in the third row and the fourth row is turned on, whereby the pixel groups 200 in the third row or the fourth row are selected.

At this time, drive signals TRG0 to TRG3 become the L level and the transfer transistors of the respective pixels 100 of the pixel groups 200 in the fourth row are turned off, while the drive signals TRG4 to TRG7 become the H level and the transfer transistors of the respective pixels 100 of the pixel groups 200 in the third row are turned on, whereby the charges generated by the photodiodes 112 of the respective pixels 100 are transferred to the floating diffusion region (FD) shared by the four pixels.

In FIG. 11, thick frames surround the pixel groups 200 in the third row in which both the selection transistor and the transfer transistor are turned on. In other words, in each of the pixel groups 200 in the third row, in the floating diffusion region (FD) shared by the four pixels, the charges transferred from the respective photodiodes 112 of the four pixels are added together, and the voltage corresponding to the added charges is input to the amplification transistor.

Then, in each of the pixel groups 200 in the third row, in the amplification transistor, the potential fluctuation of the floating diffusion region (FD) shared by the four pixels is used as the input signal voltage to the gate, and its output signal voltage is output to each of the vertical signal lines 22 (VSL1, VSL3, VSL5, VSL7) via the selection transistor.

Here, the vertical signal line 22-1 (VSL1) is connected to a comparator 210-1 in the column signal processing circuits 13 (FIG. 1). The comparator 210-1 compares a signal voltage (Vx) from the vertical signal line 22-1 (VSL1) input to the comparator 210-1 with a reference voltage (Vref) of a ramp wave (Ramp) from a DAC (not illustrated), and outputs an output signal of a level corresponding to the comparison result.

Furthermore, comparators 210-2 to the comparator 210-4 operate similarly to the comparator 210-1 except that a signal voltage to be compared with the reference voltage is replaced with a signal voltage from a vertical signal line 22-3 (VSL3), a vertical signal line 22-5 (VSL5), or a vertical signal line 22-7 (VSL7), and an output signal of a level corresponding to the comparison result is output.

Note that, in the column signal processing circuits 13, counting is performed of a reset level or a signal level on the basis of the output signal from comparators 210, whereby AD conversion is performed.

Furthermore, in FIG. 11, the analog addition processing in the R pixel groups 200, the G pixel groups 200, and the B pixel groups 200 has been described, and similarly, also in the left light-shielded pixel groups 200 and the right light-shielded pixel groups 200, the floating diffusion region (FD) is shared by the four pixels, and the charges generated by the respective photodiodes 112 of the pixels are analog-added and output.

3. Modifications (Other Examples of Solid-State Imaging Device)

Furthermore, in the embodiment described above, a case has been described as an example where the present technology is applied to the CMOS image sensor in which pixels are two-dimensionally arrayed; however, the present technology is not limited to application to the CMOS image sensor. In other words, the present technology is applicable to all the solid-state imaging devices of the X-Y address system in which pixels are two-dimensionally arrayed.

Moreover, the present technology is applicable not only to a solid-state imaging device that detects a distribution of incident light amount of visible light and captures the distribution as an image, but also to all the solid state imaging devices that capture as an image a distribution of incident amount of infrared rays, X-rays, particles, or the like.

(Other Examples of Light-Shielded Pixel)

Note that, in the above description, as the light-shielded pixels (light-shielded pixel group), the description has been made for the left light-shielded pixels 100 (left light-shielded pixel group 200) that are pixels each being shielded in the left region from the light, and the right light-shielded pixels 100 (right light-shielded pixel group 200) that are pixels each being shielded in the right region from the light; however, the light-shielded pixels only need to be shielded in the same direction from the light, and are not limited to a combination of the light-shielded pixels respectively having the light-shielded regions symmetrical to each other. For example, as the light-shielded pixels (light-shielded pixel group), a combination can be adopted of upper light-shielded pixels (upper light-shielded pixel group) that are pixels each being shielded in the upper region from the light, and lower light-shielded pixels (lower light-shielded pixel group) that are pixels each being shielded in the lower region from the light, as light-shielded pixels (light-shielded pixel group) in which the light-shielded regions are vertically-symmetrical.

(Other Examples of Phase Difference Detection)

Furthermore, in the above description, the description has been made assuming that the left light-shielded pixel group 200 and the right light-shielded pixel group 200 in which the light-shielded regions are symmetrical are combined as a pair of the phase difference pixels, to detect a phase difference; however, the left light-shielded pixel group 200 and the right light-shielded pixel group 200 do not necessarily need to be a pair of the phase difference pixels, depending on the detection method of the phase difference.

Furthermore, in the above description, the description has been made assuming that the pixel groups 200 each include the neighboring pixels 100 (four pixels) of the same color; however, the pixel group (shared pixels) including four pixels may be regarded as a pixel (shared pixel) including four divided pixels, and when the present technology is applied, the pixel group including four pixels and the pixel including four divided pixels have substantially the same meaning.

4. Configuration of Electronic Device

Figure 12:
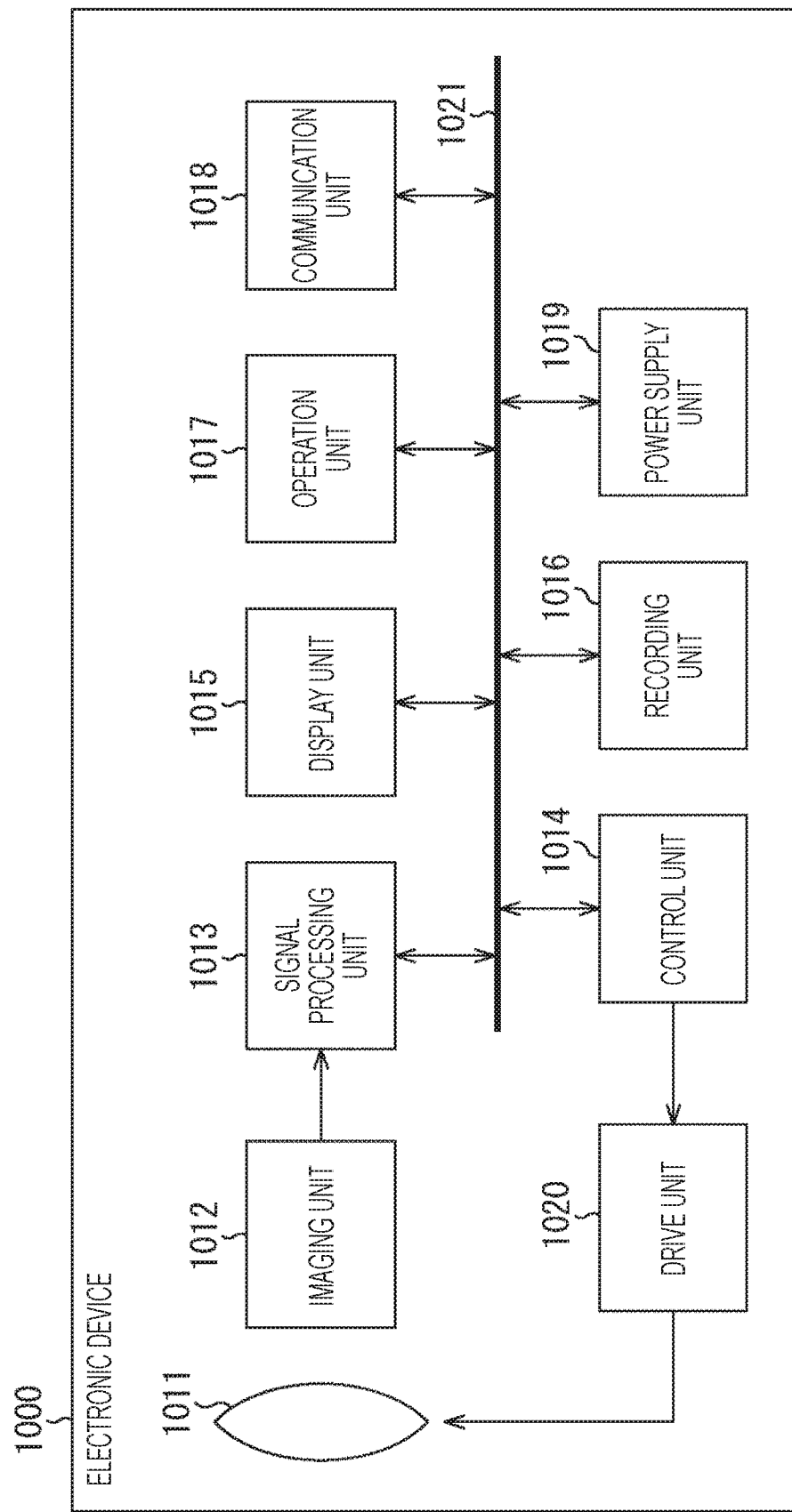
FIG. 12 is a block diagram illustrating a configuration example of an electronic device including the solid-state imaging device to which the technology according to the present disclosure is applied.

FIG. 12 is a block diagram illustrating a configuration example of an electronic device including the solid-state imaging device to which the technology according to the present disclosure is applied.

An electronic device 1000 is, for example, an electronic device having an imaging function, such as an imaging device such as a digital still camera or a video camera, or a mobile terminal device such as a smartphone or a tablet terminal.

The electronic device 1000 includes a lens unit 1011, an imaging unit 1012, a signal processing unit 1013, a control unit 1014, a display unit 1015, a recording unit 1016, an operation unit 1017, a communication unit 1018, a power supply unit 1019, and a drive unit 1020. Furthermore, in the electronic device 1000, the signal processing unit 1013, the control unit 1014, the display unit 1015, the recording unit 1016, the operation unit 1017, the communication unit 1018, and the power supply unit 1019 are connected to each other via a bus 1021.

The lens unit 1011 includes a zoom lens, a focus lens, and the like, and collects light from a subject. The light (subject light) collected by the lens unit 1011 is incident on the imaging unit 1012.

The imaging unit 1012 includes a solid-state imaging device such as an image sensor (for example, the CMOS image sensor 10 of FIG. 1) to which the technology according to the present disclosure is applied. The image sensor as the imaging unit 1012 photoelectrically converts the light (subject light) received through the lens unit 1011 into an electric signal, and supplies a signal obtained as a result to the signal processing unit 1013.

Note that, the pixel array unit of the image sensor includes, as a plurality of pixels regularly arrayed in a predetermined array pattern, pixels (normal pixels) that generate signals for generating a captured image depending on the subject light, and pixels (phase difference pixels) that generate signals for performing phase difference detection.

For example, in the above-described CMOS image sensor 10 (FIG. 1), the normal pixels correspond to the R pixels 100 (R pixel group 200), the G pixels 100 (G pixel group 200), and the B pixels 100 (B pixel group 200), and the phase difference pixels correspond to the left light-shielded pixels 100 (left light-shielded pixel group 200) and the right light-shielded pixels 100 (right light-shielded pixel group 200).

The signal processing unit 1013 is a signal processing circuit that processes the signal supplied from the imaging unit 1012. For example, the signal processing unit 1013 is configured as a digital signal processor (DSP) circuit or the like.

The signal processing unit 1013 processes the signal from the imaging unit 1012, to generate image data of a still image or a moving image, and supplies the image data to the display unit 1015 or the recording unit 1016. Furthermore, the signal processing unit 1013 generates data (phase difference detection data) for detecting a phase difference on the basis of the signal from the imaging unit 1012 (phase difference pixels of the image sensor), and supplies the data to the control unit 1014.

The control unit 1014 is configured as, for example, a central processing unit (CPU), a microprocessor, or the like. The control unit 1014 controls operation of each unit of the electronic device 1000.

The display unit 1015 is configured as, for example, a display device such as a liquid crystal panel or an organic electro luminescence (EL) panel. The display unit 1015 processes the image data supplied from the signal processing unit 1013 and displays the still image or the moving image captured by the imaging unit 1012.

The recording unit 1016 is configured as, for example, a recording medium such as a semiconductor memory or a hard disk. The recording unit 1016 records the image data supplied from the signal processing unit 1013. Furthermore, the recording unit 1016 provides recorded image data in accordance with control from the control unit 1014.

The operation unit 1017 is configured as, for example, a touch panel in combination with a display unit 1015 in addition to a physical button. The operation unit 1017 outputs operation commands for various functions of the electronic device 1000, depending on operation by a user. The control unit 1014 controls the operation of each unit on the basis of the operation commands supplied from the operation unit 1017.

The communication unit 1018 is configured as, for example, a communication interface circuit or the like. The communication unit 1018 exchanges data with an external device by wireless communication or wired communication in accordance with a predetermined communication standard.

The power supply unit 1019 supplies various power sources being operation power sources for the signal processing unit 1013, the control unit 1014, the display unit 1015, the recording unit 1016, the operation unit 1017, and the communication unit 1018, to these supply targets as appropriate.

Furthermore, the control unit 1014 detects the phase difference between two images on the basis of the phase difference detection data supplied from the signal processing unit 1013. Then, on the basis of the detection result of the phase difference, the control unit 1014 determines whether or not an object to be focused (focusing object) is in focus. In a case where the focusing object is not in focus, the control unit 1014 calculates a focus shift amount (defocus amount) and supplies the amount to the drive unit 1020.

The drive unit 1020 includes, for example, a motor, an actuator, and the like, and drives the lens unit 1011 including the zoom lens, the focus lens, and the like.

The drive unit 1020 calculates a drive amount of the focus lens of the lens unit 1011 on the basis of the defocus amount supplied from the control unit 1014, and moves the focus lens depending on the drive amount. Note that, in a case where the focusing object is in focus, the drive unit 1020 maintains the current position of the focus lens.

The electronic device 1000 is configured as described above.

As described above, the present technology is applied to the imaging unit 1012 such as an image sensor. Specifically, the CMOS image sensor 10 (FIG. 1) can be applied to the imaging unit 1012. By applying the present technology to the imaging unit 1012 such as an image sensor, the phase difference pixels can be provided with a lower degree of difficulty in manufacturing when the phase difference pixels are provided, in a case where the array pattern is adopted in which pixel groups each including neighboring pixels of the same color (shared pixels including four pixels sharing FD) are regularly arrayed, as the pixels arrayed in the pixel array unit.

5. Usage Example of Solid-State Imaging Device

Figure 13:
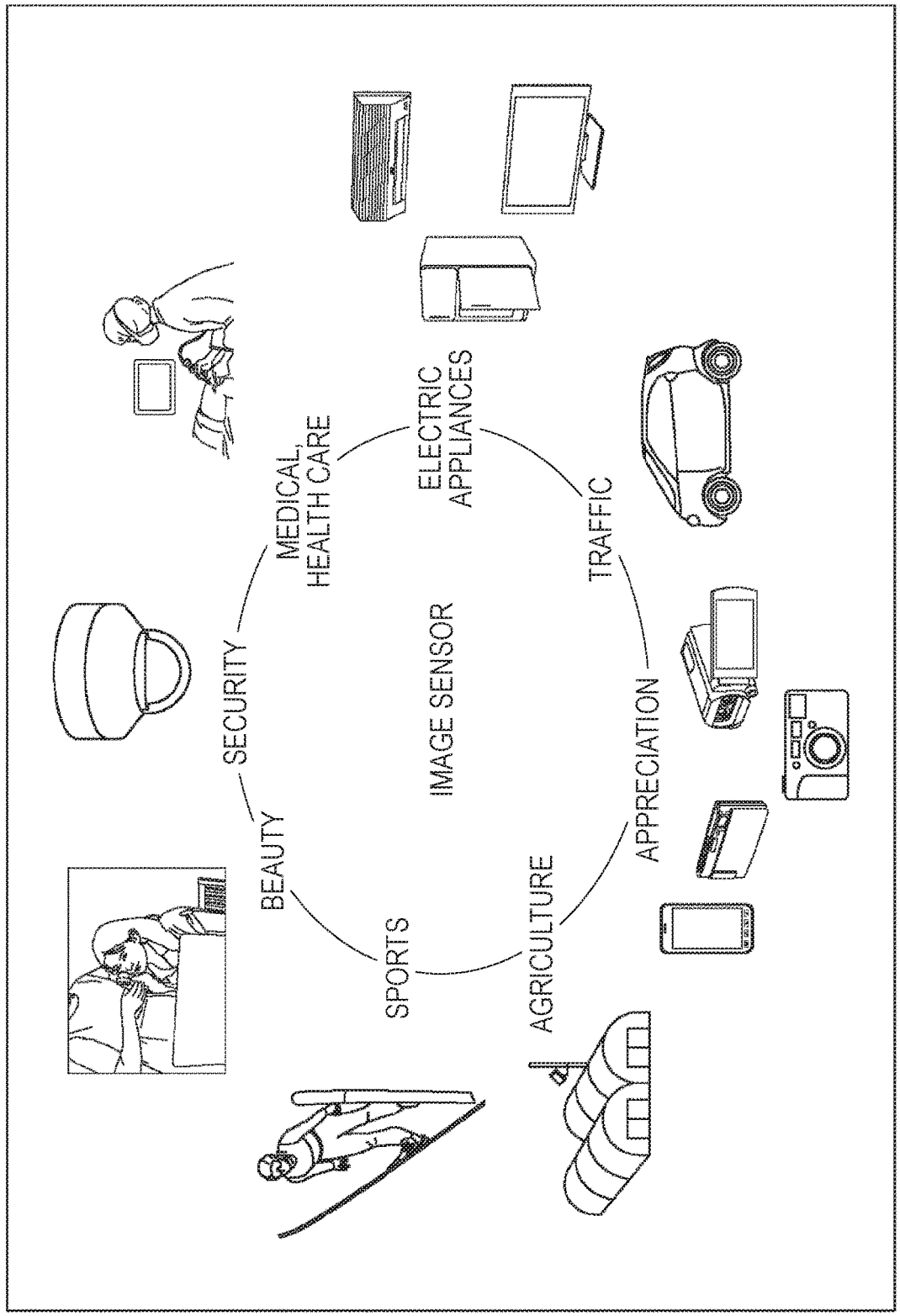
FIG. 13 is a diagram illustrating a usage example of the solid-state imaging device to which the technology according to the present disclosure is applied.

FIG. 13 is a diagram illustrating a usage example of the solid-state imaging device to which the technology according to the present disclosure is applied.

The CMOS image sensor 10 (FIG. 1) can be used for various cases of sensing light such as visible light, infrared light, ultraviolet light, or X-rays, for example, as follows. In other words, as illustrated in FIG. 13, not only in a field of appreciation in which an image to be used for appreciation is imaged, also in a device used in a field, for example, a field of traffic, a field of home electric appliances, a field of medical and health care, a field of security, a field of beauty, a field of sports, a field of agriculture, or the like, the CMOS image sensor 10 can be used.

Specifically, in the field of appreciation, the CMOS image sensor 10 can be used in a device (for example, the electronic device 1000 of FIG. 12) for imaging the image to be used for appreciation, such as a digital camera, a smartphone, a mobile phone with a camera function, for example.

In the field of traffic, for example, the CMOS image sensor 10 can be used in devices to be used for traffic, such as an automotive sensor for imaging ahead of, behind, around, and inside the car, for example, a monitoring camera for monitoring traveling vehicles and roads, and a distance measurement sensor for measuring a distance between vehicles and the like, for safe driving such as automatic stop, recognition of driver's condition, and the like.

In the field of home electric appliances, for example, the CMOS image sensor 10 can be used in devices to be used for home electric appliances, such as a television receiver, a refrigerator, and an air conditioner, for imaging a user's gesture and performing device operation in accordance with the gesture. Furthermore, in the field of medical and health care, the CMOS image sensor 10 can be used in devices to be used for medical and health care, for example, an endoscope, a device for performing angiography by receiving infrared light, and the like.

In the field of security, the CMOS image sensor 10 can be used in devices to be used for security, for example, a monitoring camera for crime prevention, a camera for person authentication, and the like. Furthermore, in the field of beauty, the CMOS image sensor 10 can be used in devices to be used for beauty, for example, a skin measuring instrument for imaging skin, a microscope for imaging a scalp, and the like.

In the field of sports, the CMOS image sensor 10 can be used in devices to be used for sports, for example, an action camera, a wearable camera, and the like for sports application or the like. Furthermore, in the field of agriculture, the CMOS image sensor 10 can be used in devices to be used for agriculture, for example, a camera for monitoring conditions of fields and crops, and the like.

6. Application Example to Mobile Body

The technology according to the present disclosure (the present technology) can be applied to various products. The technology according to the present disclosure may be implemented as a device mounted on any type of mobile body, for example, a car, an electric car, a hybrid electric car, a motorcycle, a bicycle, a personal mobility, an airplane, a drone, a ship, a robot, or the like.

Figure 14:
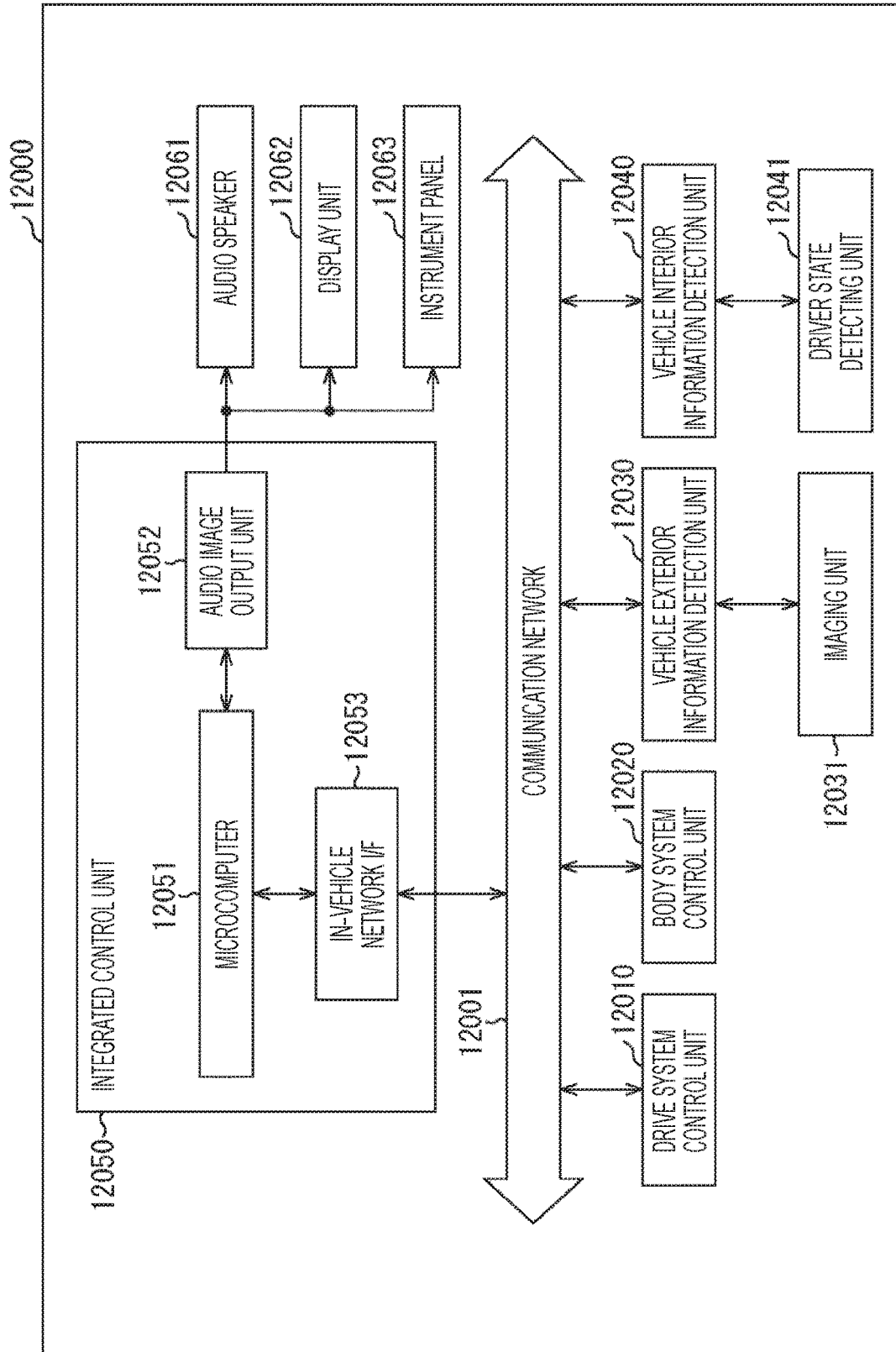
FIG. 14 is a block diagram illustrating an example of a schematic configuration of a vehicle control system.

FIG. 14 is a block diagram illustrating a schematic configuration example of a vehicle control system that is an example of a mobile body control system to which the technology according to the present disclosure can be applied.

The vehicle control system 12000 includes a plurality of electronic control units connected to each other via a communication network 12001. In the example illustrated in FIG. 14, the vehicle control system 12000 includes a drive system control unit 12010, a body system control unit 12020, a vehicle exterior information detection unit 12030, a vehicle interior information detection unit 12040, and an integrated control unit 12050. Furthermore, as functional configurations of the integrated control unit 12050, a microcomputer 12051, an audio image output unit 12052, and an in-vehicle network interface (I/F) 12053 are illustrated.

The drive system control unit 12010 controls operation of devices related to a drive system of a vehicle in accordance with various programs. For example, the drive system control unit 12010 functions as a control device of a driving force generating device for generating driving force of the vehicle, such as an internal combustion engine or a driving motor, a driving force transmitting mechanism for transmitting driving force to wheels, a steering mechanism for adjusting a steering angle of the vehicle, a braking device for generating braking force of the vehicle, and the like.

The body system control unit 12020 controls operation of various devices equipped on the vehicle body in accordance with various programs. For example, the body system control unit 12020 functions as a control device of a keyless entry system, a smart key system, a power window device, or various lamps such as a head lamp, a back lamp, a brake lamp, a turn signal lamp, and a fog lamp. In this case, to the body system control unit 12020, a radio wave transmitted from a portable device that substitutes for a key, or signals of various switches can be input. The body system control unit 12020 accepts input of these radio waves or signals and controls a door lock device, power window device, lamp, and the like of the vehicle.

The vehicle exterior information detection unit 12030 detects information on the outside of the vehicle on which the vehicle control system 12000 is mounted. For example, an imaging unit 12031 is connected to the vehicle exterior information detection unit 12030. The vehicle exterior information detection unit 12030 causes the imaging unit 12031 to capture an image outside the vehicle and receives the image captured. The vehicle exterior information detection unit 12030 may perform object detection processing or distance detection processing on a person, a car, an obstacle, a sign, a character on a road surface, or the like, on the basis of the received image.

The imaging unit 12031 is an optical sensor that receives light and outputs an electric signal corresponding to an amount of light received. The imaging unit 12031 can output the electric signal as an image, or as distance measurement information. Furthermore, the light received by the imaging unit 12031 may be visible light, or invisible light such as infrared rays.

The vehicle interior information detection unit 12040 detects information on the inside of the vehicle. The vehicle interior information detection unit 12040 is connected to, for example, a driver state detecting unit 12041 that detects a state of a driver. The driver state detecting unit 12041 includes, for example, a camera that captures an image of the driver, and the vehicle interior information detection unit 12040 may calculate a degree of fatigue or a degree of concentration of the driver, or determine whether or not the driver is dozing, on the basis of the detection information input from the driver state detecting unit 12041.

The microcomputer 12051 can calculate a control target value of the driving force generating device, the steering mechanism, or the braking device on the basis of the information on the inside and outside of the vehicle acquired by the vehicle exterior information detection unit 12030 or the vehicle interior information detection unit 12040, and output a control command to the drive system control unit 12010. For example, the microcomputer 12051 can perform cooperative control aiming for implementing functions of advanced driver assistance system (ADAS) including collision avoidance or shock mitigation of the vehicle, follow-up traveling based on an inter-vehicle distance, vehicle speed maintaining traveling, vehicle collision warning, vehicle lane departure warning, or the like.

Furthermore, the microcomputer 12051 can perform cooperative control aiming for automatic driving that autonomously travels without depending on operation of the driver, or the like, by controlling the driving force generating device, the steering mechanism, the braking device, or the like on the basis of information on the periphery of the vehicle acquired by the vehicle exterior information detection unit 12030 or the vehicle interior information detection unit 12040.

Furthermore, the microcomputer 12051 can output a control command to the body system control unit 12030 on the basis of information on the outside of the vehicle acquired by the vehicle exterior information detection unit 12030. For example, the microcomputer 12051 can perform cooperative control aiming for preventing dazzling such as switching from the high beam to the low beam, by controlling the head lamp depending on a position of a preceding vehicle or an oncoming vehicle detected by the vehicle exterior information detection unit 12030.

The audio image output unit 12052 transmits at least one of audio and image output signals to an output device capable of visually or aurally notifying an occupant in the vehicle or the outside of the vehicle of information. In the example of FIG. 14, as the output device, an audio speaker 12061, a display unit 12062, and an instrument panel 12063 are illustrated. The display unit 12062 may include, for example, at least one of an on-board display or a head-up display.

Figure 15:
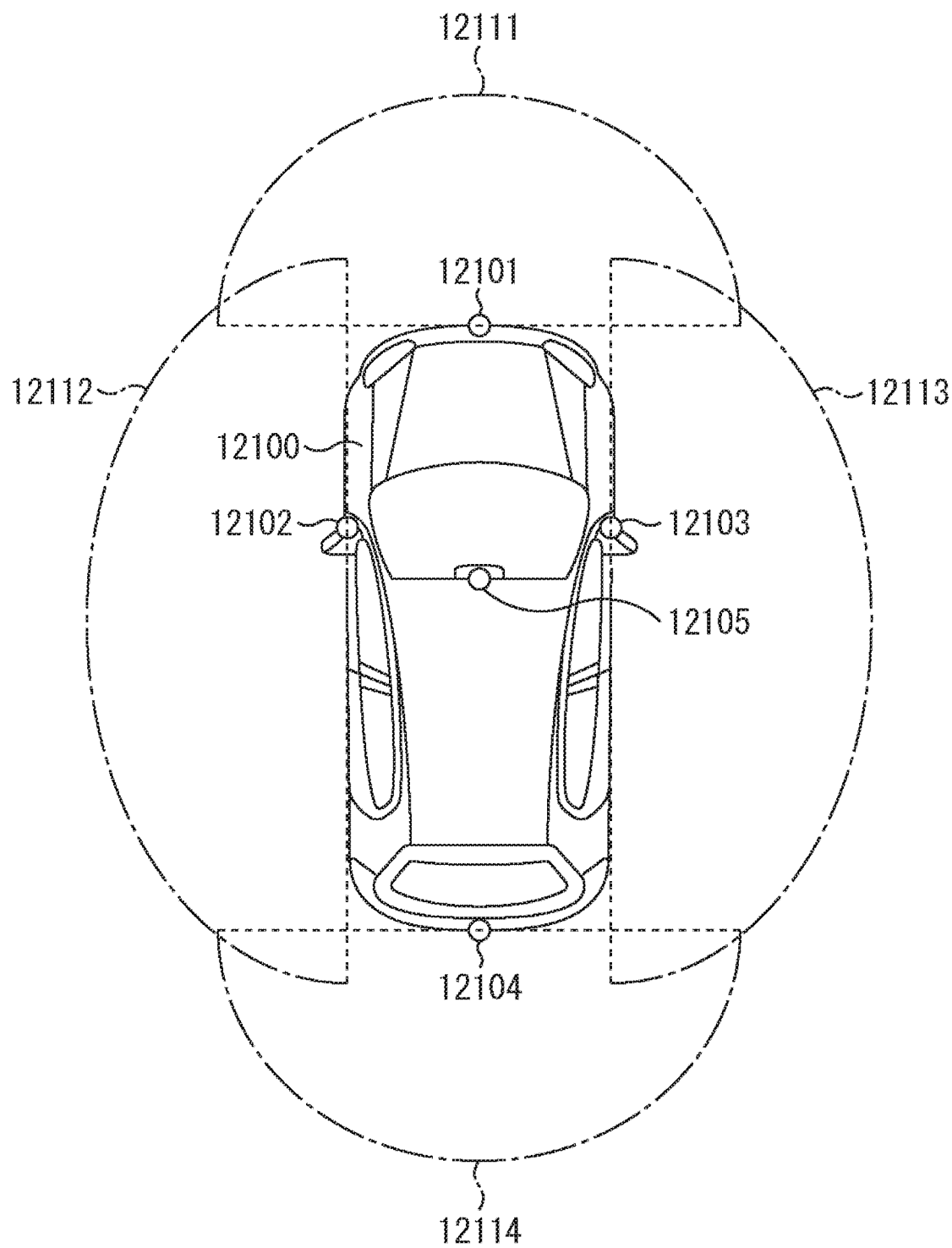
FIG. 15 is an explanatory diagram illustrating an example of installation positions of a vehicle exterior information detecting unit and an imaging unit.

FIG. 15 is a diagram illustrating an example of installation positions of the imaging unit 12031.

In FIG. 15, as the imaging unit 12031, imaging units 12101, 12102, 12103, 12104, and 12105 are included.

Imaging units 12101, 12102, 12103, 12104, and 12105 are provided at, for example, at a position of the front nose, the side mirror, the rear bumper, the back door, the upper part of the windshield in the vehicle interior, or the like, of a vehicle 12100. The imaging unit 12101 provided at the front nose and the imaging unit 12105 provided at the upper part of the windshield in the vehicle interior mainly acquire images ahead of the vehicle 12100. The imaging units 12102 and 12103 provided at the side mirrors mainly acquire images on the sides of the vehicle 12100. The imaging unit 12104 provided at the rear bumper or the back door mainly acquires an image behind the vehicle 12100. The imaging unit 12105 provided on the upper part of the windshield in the vehicle interior is mainly used for detecting a preceding vehicle, a pedestrian, an obstacle, a traffic signal, a traffic sign, a lane, or the like.

Note that, FIG. 15 illustrates an example of imaging ranges of the imaging units 12101 to 12104. An imaging range 12111 indicates an imaging range of the imaging unit 12101 provided at the front nose, imaging ranges 12112 and 12113 respectively indicate imaging ranges of the imaging units 12102 and 12103 provided at the side mirrors, an imaging range 12114 indicates an imaging range of the imaging unit 12104 provided at the rear bumper or the back door. For example, image data captured by the imaging units 12101 to 12104 are superimposed on each other, whereby an overhead image is obtained of the vehicle 12100 viewed from above.

At least one of the imaging units 12101 to 12104 may have a function of acquiring distance information. For example, at least one of the imaging units 12101 to 12104 may be a stereo camera including a plurality of imaging elements, or may be an imaging element including pixels for phase difference detection.

For example, on the basis of the distance information obtained from the imaging units 12101 to 12104, the microcomputer 12051 obtains a distance to each three-dimensional object within the imaging ranges 12111 to 12114, and a temporal change of the distance (relative speed to the vehicle 12100), thereby being able to extract, as a preceding vehicle, a three-dimensional object that is in particular a closest three-dimensional object on a traveling path of the vehicle 12100 and traveling at a predetermined speed (for example, greater than or equal to 0 km/h) in substantially the same direction as that of the vehicle 12100. Moreover, the microcomputer 12051 can set an inter-vehicle distance to be secured in advance in front of the preceding vehicle, and can perform automatic brake control (including follow-up stop control), automatic acceleration control (including follow-up start control), and the like. As described above, it is possible to perform cooperative control aiming for automatic driving that autonomously travels without depending on operation of the driver, or the like.

For example, on the basis of the distance information obtained from the imaging units 12101 to 12104, the microcomputer 12051 can extract three-dimensional object data regarding the three-dimensional object by classifying the objects into a two-wheeled vehicle, a regular vehicle, a large vehicle, a pedestrian, and other three-dimensional objects such as a utility pole, and use the data for automatic avoidance of obstacles. For example, the microcomputer 12051 identifies obstacles in the periphery of the vehicle 12100 into an obstacle visually recognizable to the driver of the vehicle 12100 and an obstacle difficult to be visually recognized. Then, the microcomputer 12051 determines a collision risk indicating a risk of collision with each obstacle, and when the collision risk is greater than or equal to a set value and there is a possibility of collision, the microcomputer 12051 outputs an alarm to the driver via the audio speaker 12061 and the display unit 12062, or performs forced deceleration or avoidance steering via the drive system control unit 12010, thereby being able to perform driving assistance for collision avoidance.

At least one of the imaging units 12101 to 12104 may be an infrared camera that detects infrared rays. For example, the microcomputer 12051 can recognize a pedestrian by determining whether or not a pedestrian exists in the captured images of the imaging units 12101 to 12104. Such pedestrian recognition is performed by, for example, a procedure of extracting feature points in the captured images of the imaging units 12101 to 12104 as infrared cameras, and a procedure of performing pattern matching processing on a series of feature points indicating a contour of an object to determine whether or not the object is a pedestrian. When the microcomputer 12051 determines that a pedestrian exists in the captured images of the imaging units 12101 to 12104 and recognizes the pedestrian, the audio image output unit 12052 controls the display unit 12062 so that a rectangular contour line for emphasis is superimposed and displayed on the recognized pedestrian. Furthermore, the audio image output unit 12052 may control the display unit 12062 so that an icon or the like indicating the pedestrian is displayed at a desired position.

In the above, an example has been described of the vehicle control system to which the technology according to the present disclosure can be applied. The technology according to the present disclosure can be applied to the imaging unit 12031 among the configurations described above. Specifically, the CMOS image sensor 10 of FIG. 1 can be applied to the imaging unit 12031. By applying the technology according to the present disclosure to the imaging unit 12031, autofocus control based on phase difference detection can be performed. Furthermore, in the technology according to the present disclosure, it is possible to implement a high sensitivity image sensor by increasing the saturation electron amount (Qs) of pixels (a pixel group including a plurality of pixels), so that it is possible to more accurately recognize an obstacle such as a pedestrian by acquiring a higher quality captured image, for example.

Note that, the embodiment of the present technology is not limited to the embodiment described above, and various modifications are possible without departing from the scope of the present technology.

Furthermore, the present technology can have a configuration as follows.

(1)

A solid-state imaging device including
a pixel array unit in which a plurality of pixels is two-dimensionally arrayed, in which
the pixel array unit has an array pattern in which a plurality of pixel groups each including neighboring pixels of an identical color is regularly arrayed, and
among the plurality of pixel groups arrayed in the array pattern, pixels configuring a light-shielded pixel group are shielded in an identical direction side from light, the light-shielded pixel group being a pixel group including pixels each being shielded in a part of a light incident side from the light.

(2)

The solid-state imaging device according to (1), in which one photoelectric conversion element is formed for one on-chip lens in the pixel.

(3)

The solid-state imaging device according to (2), in which the pixel groups each includes four pixels of 2×2, and
the four pixels configuring the light-shielded pixel group are shielded in the identical direction side from the light.

(4)

The solid-state imaging device according to any of (1) to (3), in which
the pixel groups are each configured as shared pixels that share a pixel circuit with neighboring pixels of the identical color, and each share a floating diffusion region.

(5)

The solid-state imaging device according to any of (1) to (4), in which
the light-shielded pixel group includes, in a case where the light-shielded pixel group is viewed from the light incident side, a first light-shielded pixel group including pixels each being shielded in a left region from the light or a second light-shielded pixel group including pixels each being shielded in a right region from the light, and
the first light-shielded pixel group and the second light-shielded pixel group are combined and arrayed in the array pattern.

(6)

The solid-state imaging device according to (5), in which in the pixel array unit,
the plurality of pixels is arrayed in a matrix,
a plurality of the first light-shielded pixel groups is regularly arrayed at a predetermined pixel interval in a row direction, and
a plurality of the second light-shielded pixel groups is regularly arrayed at a predetermined pixel interval in the row direction.

(7)

The solid-state imaging device according to (5) or (6), in which
in the pixel array unit,
the plurality of pixels is arrayed in a matrix, and
the first light-shielded pixel group and the second light-shielded pixel group are regularly arrayed at a predetermined pixel interval in a column direction.

(8)

The solid-state imaging device according to any of (5) to (7), in which
the first light-shielded pixel group and the second light-shielded pixel group are arranged corresponding to arrangement positions of the pixel groups each including the pixels of the identical color.

(9)

The solid-state imaging device according to (8), in which the plurality of pixels includes a red (R) pixel, a green (G) pixel, and a blue (B) pixel corresponding to red (R), green (G), and blue (B) color filters, and
the first light-shielded pixel group and the second light-shielded pixel group are each configured as a white (W) pixel.

(10)

The solid-state imaging device according to any of (1) to (9), in which
the array pattern is a Bayer array.

(11)

The solid-state imaging device according to any of (4) to (9), in which
the pixels configuring the first light-shielded pixel group and the second light-shielded pixel group are configured as pixels for phase difference detection.

(12)

An electronic device including:
an imaging unit that includes a solid-state imaging device including
a pixel array unit in which a plurality of pixels is two-dimensionally arrayed, in which
the pixel array unit has an array pattern in which a plurality of pixel groups each including neighboring pixels of an identical color is regularly arrayed, and
among the plurality of pixel groups arrayed in the array pattern, pixels configuring a light-shielded pixel group are shielded in an identical direction side from light, the light-shielded pixel group being a pixel group including pixels each being shielded in a part of a light incident side from the light; and
a control unit that performs autofocus control on the basis of a phase difference detection result obtained from output of the light-shielded pixel group.

REFERENCE SIGNS LIST

10 CMOS image sensor
11 Pixel array unit
12 Vertical drive circuit
21 Pixel drive line
22 Vertical signal line
100 Pixel
111 On-chip lens
112 Photodiode
113 Color filter
114 Light shielding portion
200 Pixel group
210 Comparator
1000 Electronic device 1012 Imaging unit
1014 Control unit
1020 Drive unit
12031 Imaging unit

The invention claimed is:

1. A light detecting device comprising:
a plurality of pixel groups including a first pixel group, a second pixel group, and a third pixel group, the first pixel group includes a first plurality of pixels that are arrayed adjacent to each other and detect light in a first range of wavelengths, the second pixel group includes a second plurality of pixels that are arrayed adjacent to each other and detect the light in a second range of wavelengths that is different from the first range of wavelengths, and the third pixel group includes a third plurality of pixels that are arrayed adjacent to each other and detect the light in a third range of wavelengths that is different from the first range of wavelengths and the second range of wavelengths,
wherein the first plurality of pixels are shielded with a first light shielding portion in a first part of a light incident side and at first borders with first adjacent pixels,
wherein the second plurality of pixels are shielded with a second light shielding portion in a second part of the light incident side and at second borders with second adjacent pixels, and
wherein the first light shielding portion is different from the second light shielding portion.

2. The light detecting device according to claim 1, wherein
one photoelectric conversion element is formed for one on-chip lens in each pixel of the plurality of pixel groups.

3. The light detecting device according to claim 2, wherein
the plurality of pixel groups each include four pixels of 2×2, and
the four pixels configuring the first pixel group are shielded in an identical direction side from the light.

4. The light detecting device according to claim 3, wherein
the plurality of pixel groups are each configured as shared pixels that share a pixel circuit with neighboring pixels of an identical color, and each share a floating diffusion region.

5. The light detecting device according to claim 3, wherein
the first pixel group includes, in a case where the first pixel group is viewed from the light incident side, pixels each being shielded in a left region from the light or a right region from the light, and
the first pixel group and the second pixel group are arrayed in an array pattern.

6. The light detecting device according to claim 5, wherein
the plurality of pixel groups is arrayed in a matrix,
the first pixel group is regularly arrayed at a first predetermined pixel interval in a row direction,
the second pixel group is regularly arrayed at a second predetermined pixel interval in the row direction, and
the third pixel group is regularly arrayed at a third predetermined pixel interval in the row direction.

7. The light detecting device according to claim 5, wherein
the plurality of pixel groups is arrayed in a matrix, and
the first pixel group and the second pixel group are regularly arrayed at a fourth predetermined pixel interval in a column direction, and
the third pixel group is regularly arrayed at a fifth predetermined pixel interval in the column direction.

8. The light detecting device according to claim 5, wherein
the first pixel group and the second pixel group are arranged corresponding to arrangement positions of the plurality of pixel groups each including the pixels of an identical color.

9. The light detecting device according to claim 8, wherein
the second pixel group includes a red (R) pixel, a green (G) pixel, and a blue (B) pixel corresponding to red (R), green (G), and blue (B) color filters, and
the first pixel group includes a white (W) pixel.

10. The light detecting device according to claim 5, wherein
shared pixels of the first pixel group are configured as pixels for phase difference detection.

11. The light detecting device according to claim 1, wherein
the plurality of pixel groups is arrayed in a matrix, and
an array pattern of the matrix is a Bayer array.

12. The light detecting device according to claim 1, wherein
the first light shielding portion is larger than the second light shielding portion.

13. The light detecting device according to claim 1, wherein
the first pixel group includes a first color filter portion that does not filter red light, green light and blue light from the light,
the second pixel group includes a second color filter portion that does filter one of the red light, the green light, or blue light from the light, and
the third pixel group includes a third color filter portion that does filter one of the red light, the green light, or blue light from the light, and
the third color filter portion is different from the second color filter portion.

14. An electronic device comprising:
an imaging unit that includes a light detecting device including
a plurality of pixel groups including a first pixel group, a second pixel group, and a third pixel group, the first pixel group includes a first plurality of pixels that are arrayed adjacent to each other and detect light in a first range of wavelengths, the second pixel group includes a second plurality of pixels that are arrayed adjacent to each other and detect the light in a second range of wavelengths that is different from the first range of wavelengths, and the third pixel group includes a third plurality of pixels that are arrayed adjacent to each other and detect the light in a third range of wavelengths that is different from the first range of wavelengths and the second range of wavelengths,
wherein the first plurality of pixels are shielded with a first light shielding portion in a first part of a light incident side and at first borders with first adjacent pixels, wherein the second plurality of pixels are shielded with a second light shielding portion in a second part of the light incident side and at second borders with second adjacent pixels, wherein the first light shielding portion is different from the second light shielding portion.

15. The electronic device according to claim 14, wherein the plurality of pixel groups each include four pixels of 2×2, and the four pixels configuring the first pixel group are shielded in an identical direction side from the light.

16. The electronic device according to claim 15, wherein the plurality of pixel groups are each configured as shared pixels that share a pixel circuit with neighboring pixels of an identical color, and each share a floating diffusion region.

17. The electronic device according to claim 15, wherein the plurality of pixel groups is arrayed in a matrix, the first pixel group is regularly arrayed at a first predetermined pixel interval in at least one of a row direction or a column direction, the second pixel group is regularly arrayed at a second predetermined pixel interval in the at least one of the row direction or the column direction, and the third pixel group is regularly arrayed at a third predetermined pixel interval in the row direction.

18. The electronic device according to claim 14, wherein the second pixel group includes a red (R) pixel, a green (G) pixel, and a blue (B) pixel corresponding to red (R), green (G), and blue (B) color filters, and the first pixel group includes a white (W) pixel.

19. The electronic device according to claim 14, wherein the first light shielding portion is larger than the second light shielding portion.

20. The electronic device according to claim 14, wherein the first pixel group includes a first color filter portion that does not filter red light, green light and blue light from the light, the second pixel group includes a second color filter portion that does filter one of the red light, the green light, or blue light from the light, the third pixel group includes a third color filter portion that does filter one of the red light, the green light, or blue light from the light, and the third color filter portion is different from the second color filter portion.

* * * * *